United States Patent
Wang et al.

(10) Patent No.: US 11,562,271 B2
(45) Date of Patent: Jan. 24, 2023

(54) CONTROL METHOD, TERMINAL, AND SYSTEM USING ENVIRONMENTAL FEATURE DATA AND BIOLOGICAL FEATURE DATA TO DISPLAY A CURRENT MOVEMENT PICTURE

(71) Applicant: Huawei Technologies Co., Ltd., Shenzhen (CN)

(72) Inventors: Jianfeng Wang, Nanjing (CN); Hao Chen, Nanjing (CN); Shengfeng Zhou, Nanjing (CN); Qing Wang, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 634 days.

(21) Appl. No.: 16/496,265

(22) PCT Filed: Oct. 31, 2017

(86) PCT No.: PCT/CN2017/108458
§ 371 (c)(1),
(2) Date: Sep. 20, 2019

(87) PCT Pub. No.: WO2018/171196
PCT Pub. Date: Sep. 27, 2018

(65) Prior Publication Data
US 2020/0034729 A1     Jan. 30, 2020

(30) Foreign Application Priority Data

Mar. 21, 2017  (CN) .......................... 201710171128.8

(51) Int. Cl.
*G06N 5/04*      (2006.01)
*G06F 3/01*      (2006.01)
(Continued)

(52) U.S. Cl.
CPC ........... *G06N 5/045* (2013.01); *A63F 13/533* (2014.09); *A63F 13/79* (2014.09); *G06F 3/012* (2013.01);
(Continued)

(58) Field of Classification Search
CPC ...... G06N 5/045; G06N 20/00; A63F 13/533; A63F 13/79; G06V 20/00; G06F 3/12; G06F 3/015; G06F 21/32; G06T 7/20
See application file for complete search history.

(56) References Cited

U.S. PATENT DOCUMENTS 5,462,504 A * 10/1995 Trulaske ................ A61B 5/222
                                                 482/901
6,705,972 B1 * 3/2004 Takano .................. G06N 3/006
                                                   482/7
(Continued)

FOREIGN PATENT DOCUMENTS

CN      101788848 A      7/2010
CN      101510074 B     12/2010
(Continued)

OTHER PUBLICATIONS

Machine Translation and Abstract of Chinese Publication No. CN101510074, Dec. 8, 2010, 16 pages.
(Continued)

*Primary Examiner* — Steve Rowland
(74) *Attorney, Agent, or Firm* — Conley Rose, P.C.

(57) ABSTRACT

A control method includes obtaining feature data using at least one sensor, the feature data being acquired by the terminal using the at least one sensor, generating an action instruction based on the feature data and a decision-making mechanism of the terminal, and executing the action instruction. In this application, various aspects of feature data are acquired using a plurality of sensors, data analysis is per- (Continued)

formed on the feature data, and a corresponding action instruction is then generated based on a corresponding decision-making mechanism to implement interactive control.

18 Claims, 14 Drawing Sheets

(51) Int. Cl.
*G06T 7/20* (2017.01)
*G06F 21/32* (2013.01)
*G06N 20/00* (2019.01)
*A63F 13/533* (2014.01)
*A63F 13/79* (2014.01)
*G06V 20/00* (2022.01)
*A63F 13/212* (2014.01)
*G06V 40/12* (2022.01)
*G06V 40/16* (2022.01)
*G06V 40/18* (2022.01)

(52) U.S. Cl.
CPC .............. *G06F 3/015* (2013.01); *G06F 21/32* (2013.01); *G06N 20/00* (2019.01); *G06T 7/20* (2013.01); *G06V 20/00* (2022.01); *A63F 13/212* (2014.09); *A63F 2300/1012* (2013.01); *A63F 2300/303* (2013.01); *A63F 2300/5546* (2013.01); *G06F 2203/011* (2013.01); *G06V 40/12* (2022.01); *G06V 40/16* (2022.01); *G06V 40/18* (2022.01)

(56) References Cited

U.S. PATENT DOCUMENTS

| | | | | |
|---|---|---|---|---|
| 6,902,513 | B1* | 6/2005 | McClure | A63B 24/0006 482/4 |
| 7,070,539 | B2* | 7/2006 | Brown | G06F 13/4027 482/8 |
| 7,800,493 | B2 | 9/2010 | Terauchi et al. | |
| 2006/0025282 | A1* | 2/2006 | Redmann | A63B 71/0622 482/8 |
| 2007/0167204 | A1* | 7/2007 | Lyle | A63F 13/79 463/9 |
| 2007/0239479 | A1* | 10/2007 | Arrasvuori | G16H 20/30 482/8 |
| 2013/0260800 | A1* | 10/2013 | Asakawa | H04W 4/029 455/457 |
| 2013/0330705 | A1 | 12/2013 | Grimaud et al. | |
| 2014/0004948 | A1* | 1/2014 | Watkins, Jr. | A63F 13/10 463/36 |
| 2014/0111690 | A1 | 4/2014 | Kim et al. | |
| 2014/0247146 | A1* | 9/2014 | Proud | A61B 5/1118 340/870.02 |
| 2014/0249853 | A1* | 9/2014 | Proud | G16H 40/67 705/3 |
| 2015/0081210 | A1* | 3/2015 | Yeh | G16H 20/30 701/428 |
| 2016/0206239 | A1 | 7/2016 | Yoon et al. | |
| 2016/0220198 | A1* | 8/2016 | Proud | A61B 5/0022 |
| 2016/0249191 | A1* | 8/2016 | Avrahami | H04W 4/12 |
| 2017/0046025 | A1* | 2/2017 | Dascola | G06F 3/04845 |
| 2017/0206694 | A1* | 7/2017 | Jiao | G06T 7/246 |
| 2017/0357417 | A1* | 12/2017 | Goossens | G06Q 10/10 |
| 2018/0088787 | A1* | 3/2018 | Bereza | G06F 3/0488 |
| 2018/0350144 | A1* | 12/2018 | Rathod | G06T 13/40 |
| 2019/0001223 | A1* | 1/2019 | Blackstock | A63F 13/63 |
| 2019/0094981 | A1* | 3/2019 | Bradski | G06F 3/017 |
| 2019/0204907 | A1* | 7/2019 | Xie | A63F 13/424 |
| 2019/0258850 | A1* | 8/2019 | Rihn | G06V 40/174 |
| 2019/0270018 | A1* | 9/2019 | Evans | A63F 13/79 |
| 2020/0019242 | A1* | 1/2020 | Atlas | G06N 20/00 |
| 2020/0342648 | A1* | 10/2020 | Shimizu | G06F 3/0481 |

FOREIGN PATENT DOCUMENTS

| | | |
|---|---|---|
| CN | 103488994 A | 1/2014 |
| CN | 103826146 A | 5/2014 |
| CN | 104298722 A | 1/2015 |
| CN | 105556581 A | 5/2016 |
| CN | 105759654 A | 7/2016 |
| CN | 105807913 A | 7/2016 |
| CN | 105929942 A | 9/2016 |

OTHER PUBLICATIONS

Machine Translation and Abstract of Chinese Publication No. CN101788848, Jul. 28, 2010, 22 pages.
Machine Translation and Abstract of Chinese Publication No. CN105759654, Jul. 13, 2016, 7 pages.
Foreign Communication From A Counterpart Application, PCT Application No. PCT/CN2017/108458, English Translation of International Search Report dated Jan. 26, 2017, 2 pages.
Foreign Communication From A Counterpart Application, PCT Application No. PCT/CN2017/108458, English Translation of Written Opinion dated Jan. 26, 2017, 4 pages.

* cited by examiner

CONTROL METHOD, TERMINAL, AND SYSTEM USING ENVIRONMENTAL FEATURE DATA AND BIOLOGICAL FEATURE DATA TO DISPLAY A CURRENT MOVEMENT PICTURE

CROSS-REFERENCE TO RELATED APPLICATIONS

This application is a U.S. National Stage of International Patent Application No. PCT/CN2017/108458 filed on Oct. 31, 2017, which claims priority to Chinese Patent Application No. 201710171128.8 filed on Mar. 21, 2017. Both of the aforementioned applications are hereby incorporated by reference in their entireties.

TECHNICAL FIELD

This application relates to the field of data processing, and in particular, to a control method, terminal, and system.

BACKGROUND

As the virtual reality (Virtual Reality, VR) industry emerges, applications of systems for interaction between a human and a virtual scene become increasingly popular. With the spread of intelligent devices and the development of artificial intelligence technologies, future intelligent devices will definitely develop into more in-depth and extensive interactive systems.

Limited by existing sensor technologies, data sources in interactive systems are severely restricted, resulting in less realistic virtual scenes of the interactive systems. For example, only cameras are used to acquire images of eyes in VR glasses to implement line-of-sight tracking and intelligent interaction, lines of sight are inadequately estimated, and as a result the VR glasses provide undesirable experience and functions.

SUMMARY

In view of this, this application provides a control method, terminal, and system, to resolve a technical problem that an interactive system has relatively low accuracy because of restricted data sources.

According to a first aspect, an application provides a control method, applied to a terminal, and including the following steps: obtaining feature data using at least one sensor, generating an action instruction based on the feature data and a decision-making mechanism of the terminal, and then executing the action instruction to implement interactive control. It may be learned that in this application, various aspects of feature data are acquired using a plurality of sensors, data analysis is performed on the feature data, and a corresponding action instruction is then generated based on a corresponding decision-making mechanism to implement interactive control. Compared with relatively low accuracy of interactive control because of restricted data sources in the prior art, data sources are added in this application to remedy such a disadvantage, and decision making is performed for interactive control from various aspects, thereby significantly improving accuracy of interactive control.

In a first implementation of the first aspect, the feature data includes at least biological feature data and environmental feature data of a user; and the generating an action instruction based on the feature data and a decision-making mechanism of the terminal includes: controlling, based on at least one piece of data, for example, brainwave data, biomarker data, and muscle movement data in the biological feature data and at least one piece of data, for example, temperature data, humidity data, noise data, light intensity data, and air quality data in the environmental feature data, the terminal to enter a target working mode. Alternatively, the feature data includes only environmental feature data; and the generating an action instruction based on the feature data and a decision-making mechanism of the terminal includes: controlling, based on at least a part of the environmental feature data, the terminal to enter a target working mode.

In a second implementation of the first aspect, the feature data includes at least the biological feature data and the environmental feature data of a user; and the generating an action instruction based on the feature data and a decision-making mechanism of the terminal includes: controlling, at least based on brainwave data and muscle movement data in the biological feature data and temperature data, humidity data, image data, and sound data in the environmental feature data, the terminal to display a current movement picture of the user. Alternatively, the feature data includes only environmental feature data; and the generating an action instruction based on the feature data and a decision-making mechanism of the terminal includes: controlling, based on at least a part of the environmental feature data, the terminal to display a current movement picture.

In a third implementation of the first aspect, the feature data includes at least the biological feature data and the environmental feature data of a user; the generating an action instruction based on the feature data and a decision-making mechanism of the terminal includes: controlling, at least based on biomarker data and brainwave data of the user in the biological feature data and image data of a road, speed data of a vehicle, temperature data, position data, and humidity data in the environmental feature data, the terminal to prompt road driving information. Alternatively, the feature data includes only environmental feature data; and the generating an action instruction based on the feature data and a decision-making mechanism of the terminal includes: controlling, based on at least a part of the environmental feature data, the terminal to prompt road driving information.

In a fourth implementation of the first aspect, the generating an action instruction based on the feature data and the decision-making mechanism includes: obtaining environmental status information at least based on temperature data, humidity data, image data, image depth data, direction data, and position data in the feature data, where the environmental status information includes: object element information and comfort level information in an environment; and controlling, based on the object element information and the comfort level information in the environment, the terminal to prompt environment related information.

In a fifth implementation of the first aspect, the generating an action instruction based on the feature data and the decision-making mechanism includes: obtaining biological status information at least based on muscle movement status data, brainwave data, and face image data in the feature data, where the biological status information includes at least biological movement status information and biological emotion status information; and controlling, based on the biological movement status information and the biological emotion status information, the terminal to display biologically related information.

Specifically, in all implementations of the first aspect, the user may be identified by using biological feature information obtained via a sensor. For example, the user is identified based on one or any combination of fingerprint data, iris data, and face data. After an identity is verified, there may be at least two operations. In the first operation, the action of generating an instruction is performed only after the identity is verified. In the second operation, the action of executing an instruction is executed after the identity is verified. Both the operations are feasible, and this solution is not limited thereto. The action instruction includes at least: controlling the terminal to emit speech, controlling the terminal to perform display, and controlling the terminal to trigger one or more of functions of an application.

Specifically, in a possible implementation, the generating an action instruction based on the feature data and a decision-making mechanism of the terminal includes: analyzing the feature data to obtain an output result; determining a decision-making mechanism corresponding to the feature data; and determining an action instruction corresponding to the output result based on the decision-making mechanism. The analyzing the feature data to obtain an output result includes: performing data source recognition and categorization on the feature data; and processing the categorized feature data by using a corresponding data processing algorithm to obtain the output result. Specifically, element recognition may be performed on the biological feature data by using a biological recognition algorithm to obtain the output result, where the output result includes at least one or any combination of a fingerprint recognition result, an iris recognition result, a face recognition result, and a biological movement status recognition result; and element recognition is performed on the environmental feature data by using a physical basic data processing algorithm to obtain the output result, where the output result includes at least one or any combination of a type recognition result, a size recognition result, a position and direction recognition result, a material recognition result, and a status recognition result of an object in an environment, an environmental temperature recognition result, and an environmental humidity recognition result.

In a possible implementation, data learning and data correction may further be performed on data of the output result in this solution. Further, the feature data and the learned and corrected output result are stored. After the executing the action instruction, the method further includes: generating feedback information based on an execution result generated after the action instruction is executed and the stored data, thereby improving accuracy of an output result a next time.

According to a second aspect, an embodiment of this application provides a terminal, including: a processor and a memory, where the memory is configured to store computer executable instructions, the processor and the memory are connected by using the bus, and when the terminal is run, the processor executes the computer executable instructions stored in the memory to enable the terminal to perform the application switching method in any one of the foregoing implementations.

According to a third aspect, an embodiment of this application provides a terminal, including: at least one sensor, configured to obtain feature data; and a processor, configured to: generate an action instruction based on the feature data and a decision-making mechanism of the terminal; and execute the action instruction.

According to a fourth aspect, an embodiment of this application provides an apparatus, including: an obtaining unit, configured to obtain feature data using at least one sensor, the feature data being data acquired by the terminal using the at least one sensor; a generation unit, configured to generate an action instruction based on the feature data and a decision-making mechanism of the terminal; and an execution unit, configured to execute the action instruction.

According to a fifth aspect, an embodiment of this application provides a computer readable storage medium, where the computer readable storage medium stores instructions, and when being executed on the terminal in any one of the foregoing implementations, the instructions enable the terminal to perform the application switching method in any one of the foregoing implementations.

According to a sixth aspect, an embodiment of this application provides a computer program product including instructions, where when being executed on the terminal in any one of the foregoing implementations, the instructions enable the terminal to perform the application switching method in any one of the foregoing implementations.

According to a seventh aspect, an embodiment of this application provides a control system, including the following structures: a sensor that acquires at least one piece of feature data and a control terminal, where the control terminal obtains feature data via the at least one sensor, generates an action instruction based on the feature data and a decision-making mechanism of the control terminal, and then executes the action instruction to implement interactive control. It may be learned that in this application, a plurality of sensors are disposed to acquire various aspects of feature data, data analysis is performed on the feature data, and a corresponding action instruction is then generated based on a corresponding decision-making mechanism to implement interactive control. Compared with relatively low accuracy of interactive control because of restricted data sources in the prior art, data sources are added in this application to remedy such a disadvantage, and decision making is performed for interactive control from various aspects, thereby significantly improving accuracy of interactive control.

In the embodiments of this application, names of the terminals do not constitute limitations to the devices. In actual implementations, these devices may appear with other names. Devices fall within the scope of the claims of this application and equivalent technologies thereof provided that the devices have functions similar to those in the embodiments of this application.

In addition, for technical effects of any one of the designs of the second aspect to the seventh aspect, refer to technical effects of different designs of the first aspect. Details are not described herein again.

DESCRIPTION OF DRAWINGS

To describe the technical solutions in the embodiments of this application or in the prior art more clearly, the following briefly describes the accompanying drawings required for describing the embodiments or the prior art. Apparently, the accompanying drawings in the following description only show some embodiments of this application, and a person of ordinary skill in the art may still derive other drawings from these accompanying drawings without creative efforts.

DESCRIPTION OF EMBODIMENTS

This application mainly provides an interactive system for next-generation intelligent terminals. In the interactive system, a plurality of sensors are used, data processing principles such as biomedicine, gesture recognition, and image technologies are combined, and a movement machine learning method is used together, to perform complex single-factor and multi-factor decision making. The main purpose of the system is to enhance experience of immersive virtual interaction and improve vividness of interaction and feedback in virtual scenes. Moreover, interaction policies in augmented reality can offer better arrangements and recommendations, to better assist a user in improving work and life. Before the solution of this application is described in detail, for ease of understanding, two examples of scenes to which this solution is applicable are provided.

First, this solution is applicable to a sport scene, for example, a tennis scene. Current VR sport games mostly involve simple man-machine interaction. Embodiments of this application focus on vivid experience and exercise effect of sports.

Figure 14:
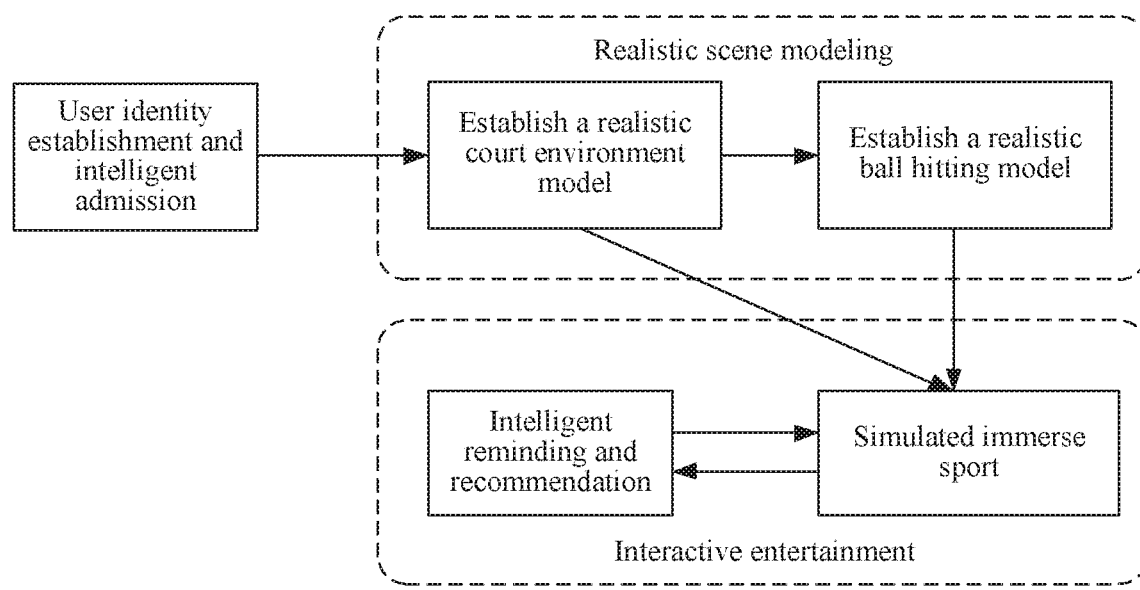
FIG. 14 is diagram showing another application example according to an embodiment of this application.

A simulated tennis system in the embodiments is implemented by using an interactive control terminal, for example, a VR gaming terminal. The interactive control terminal includes corresponding modules or components, so that the interactive control terminal performs steps shown in FIG. 14: User identity establishment and intelligent admission, establishment of a realistic court environment model, establishment of a realistic ball hitting model, simulation of immersive gameplay, and intelligent reminding and recommendation, which are specifically as follows:

1. User identity establishment and intelligent admission: A built-in memory or an external memory is disposed in the interactive control terminal and stores identity verification information of a user in advance. On the interactive control terminal, a fingerprint sensor acquires fingerprint data (the fingerprint sensor may be an independent entity connected to the interactive control terminal using Wi-Fi or Bluetooth) or an iris sensor acquires iris data, and the data is sent to a processor in the terminal. The processor compares the data with existing results of a database. If data consistent with the fingerprint data or the iris data is present in the database, the user enters a corresponding user control. For example, an action instruction of opening a court interface is generated and executed (correspondingly, in a payment scene, if there is consistent data, an action instruction of opening a payment page is generated and executed, the user enters the payment page, or an action instruction of making deduction is generated and executed to complete a payment function, and the like). If there is no consistent data, image data of a human face acquired by using a single camera or a plurality of cameras is used to recognize the human face, to assist in identifying the user. If a corresponding user still does not exist by using an assisted recognition method, an action instruction of creating a new user space is generated and executed to perform an operation of creating a user account, to implement corresponding functions after the user logs in to the account.

2. After the user has logged in, the interactive control terminal establishes a realistic court environment model. For example, the user goes to a favorite court and invites a friend by using chat software or invites a friend online to play a realistic tennis game.

The interactive control terminal acquires image data, image depth data, position data, direction data, and the like via various sensors and makes analysis by using the processor, to perform image recognition on a realistic court surface. Texture data of various courts that is stored in advance in a court surface texture database is compared to determine court texture of a realistic court and determine an elasticity coefficient of the court surface, and a tennis ball movement model is established based on the elasticity coefficient. The interactive control terminal in the embodiments performs image recognition on an entire court and determines, in combination with image depth data, a court size, boundary line positions, a net height and position, venue decorations and positions, and the like. The determined content is then combined to establish a three-dimensional virtual model of the realistic court.

A process of establishing a realistic ball hitting model by the interactive control terminal includes the following processes:

1) Physical data such as temperature data, humidity data, and wind speed data is acquired, and a physical environment of a tennis venue is determined.

2) Muscle status data such as muscle pressure data, ball hitting direction data, and the like at the moment when a ball is hit are acquired repeatedly, and a vector determination model of an initial speed of a tennis ball is established by combining the physical data acquired in 1) and based on a machine learning method, and data keeps being corrected as an amount of data increases.

3) Ball movement image data, image depth data, and speed data are acquired, and data processing is performed to output a movement trajectory of a tennis ball. A tennis ball movement model is jointly determined by combining the initial speed of the tennis ball in 2), the physical data in 1), and an elasticity coefficient of court texture and based on a machine learning method, and the model keeps being corrected as data is repeatedly acquired.

3. Simulation of Immersive Gameplay:

1) Image data (for example, image data of a user serving a tennis ball) and muscle status data are acquired to determine a posture (for example, a ball hitting direction) and strength of the user.

2) Results in 1) are input to the tennis ball movement model to determine an initial speed of the tennis ball.

3) A movement trajectory of the tennis ball is determined by combining the initial speed and the tennis ball movement model.

4) An excitement level of the user is determined based on brainwave data. Eyeball image data, simulated ball hitting image data, and muscle status data of the user are acquired. An eyeball tracking trajectory and a simulated ball hitting trajectory are drawn to determine a hitting point and strength when the user returns the tennis ball.

5) Provide sound feedback based on 1) and 4) when the tennis ball is hit, and provide simulated video feedback throughout the process. For example, muscle pressure feedback strength is determined based on the speed of the tennis ball.

4. Intelligent Reminding and Recommendation:

1) A movement recommendation and a strategy recommendation are provided to the user by combining the physical data and the speed of the tennis ball in the tennis ball movement model. For example, it is determined, by combining the impact of temperature data and humidity data on the speed of the tennis ball, whether the speed of the tennis ball is excessively fast, normal, or excessively slow.

2) Wind speed conditions are considered to recommend a strategy to the user. For example, the wind speed is excessively fast, and it is recommended that the user reduces a hitting force.

3) The user is reminded of suitable exercise time and strength based on a physical environment and an excitement level of the user.

Therefore, the solution effectively improves interactivity when the user plays a game, so that the user can be immersed in the game more deeply, thereby improving gaming experience.

First, this solution is applicable to a driving scene. For example, an example in which this application is applied to an intelligent trip is used for description. For example, a simulated trip of driving a car to attend a meeting is used:

The simulated trip in the embodiments is implemented by using the interactive control terminal, for example, an intelligent in-vehicle device. The interactive control terminal may include functions such as identity establishment and intelligent admission of the user, determination of a physiological status of the user, determination of a mental state of the user, intelligent environment determination, intelligent arrangement, and intelligent reminding and recommendation:

1. User identity establishment and intelligent admission: The interactive control terminal acquires fingerprint data or iris data via a sensor, and sends the data to the processor in the terminal. The processor compares the data with existing results of a database. If data consistent with the data is present in the database, a user enters a corresponding user control. For example, an instruction of opening a driving simulation page is generated and executed. If there is no consistent data, the processor performs assisted recognition by combining image data of a human face. If a corresponding user still does not exist, an action instruction of creating a new user space is generated and executed to implement corresponding functions.

2. After the user has logged in, the user determines a trip of driving a car to attend a meeting;

1) The interactive control terminal acquires related feature data (including a magnetic field, various blood indicators, a heart rate, a body temperature, and the like of the user) of physiological signs via sensors and sends the related feature data to the processor in the terminal. The processor processes the data according to a corresponding biomedical analysis algorithm, then determines a physiological status (including a health status, a tiredness level, and the like) of the user by combining historical records of the body of the user from machine learning, and determines impact on the trip of the user and corresponding recommendations (for example, the user is terribly tired and is unfit to drive a car).

2) The interactive control terminal acquires image data of the face of the user and brainwave data of the user, the processor performs microexpression recognition on the image data by using an image recognition technology, and performs excitement level recognition analysis on the brainwave data. Therefore, corresponding mental indicators (for example, the user is extremely excited and is advised to drive more attentively) are jointly determined based on microexpression and an excitement level.

3) The interactive control terminal acquires image data of a road and speed data of a vehicle during driving. The processor analyzes the image data, recognizes a road condition environment by using an image recognition technology, and determines driving experience and provides corresponding recommendations (for example, a road condition is good and there is no plenty of time for the trip, so that the user may speed up properly) by combining the speed data and trip data, for example, generates and executes an action instruction of displaying recommendation information.

4) The interactive control terminal acquires physical data such as temperature data, humidity data, and the like. The processor analyzes the data to determine driving experience corresponding to an environment (for example, the environment is unfavorable, and it is not suitable to drive for a long time).

5) Based on the determination results in 1), 2), 3), and 4), the processor performs comprehensive determination to intelligently recommend driving safety instructions, driving speed, and rest time to the user and offer risk reminders about missing an appointment and the like.

6) Based on the determination results in 1), 2), 3) and 4), the processor performs comprehensive determination to improve a driving environment and enhance user experience (for example, by choosing some light music and adjusting the temperature of an air conditioner).

Therefore, the solution effectively improves driving safety, and effectively improves a driving comfort level for a user while ensuring safe driving of the user.

A control method provided in an embodiment of this application may be applied to any terminal such as a mobile phone, a terminal, an augmented reality (AR) device/a virtual reality (VR) device, a tablet computer, a notebook computer, an ultra-mobile personal computer (UMPC), a netbook, and a personal digital assistant (PDA). Certainly, in the following embodiments, a specific form of the terminal is not limited in any way.

Figure 1:
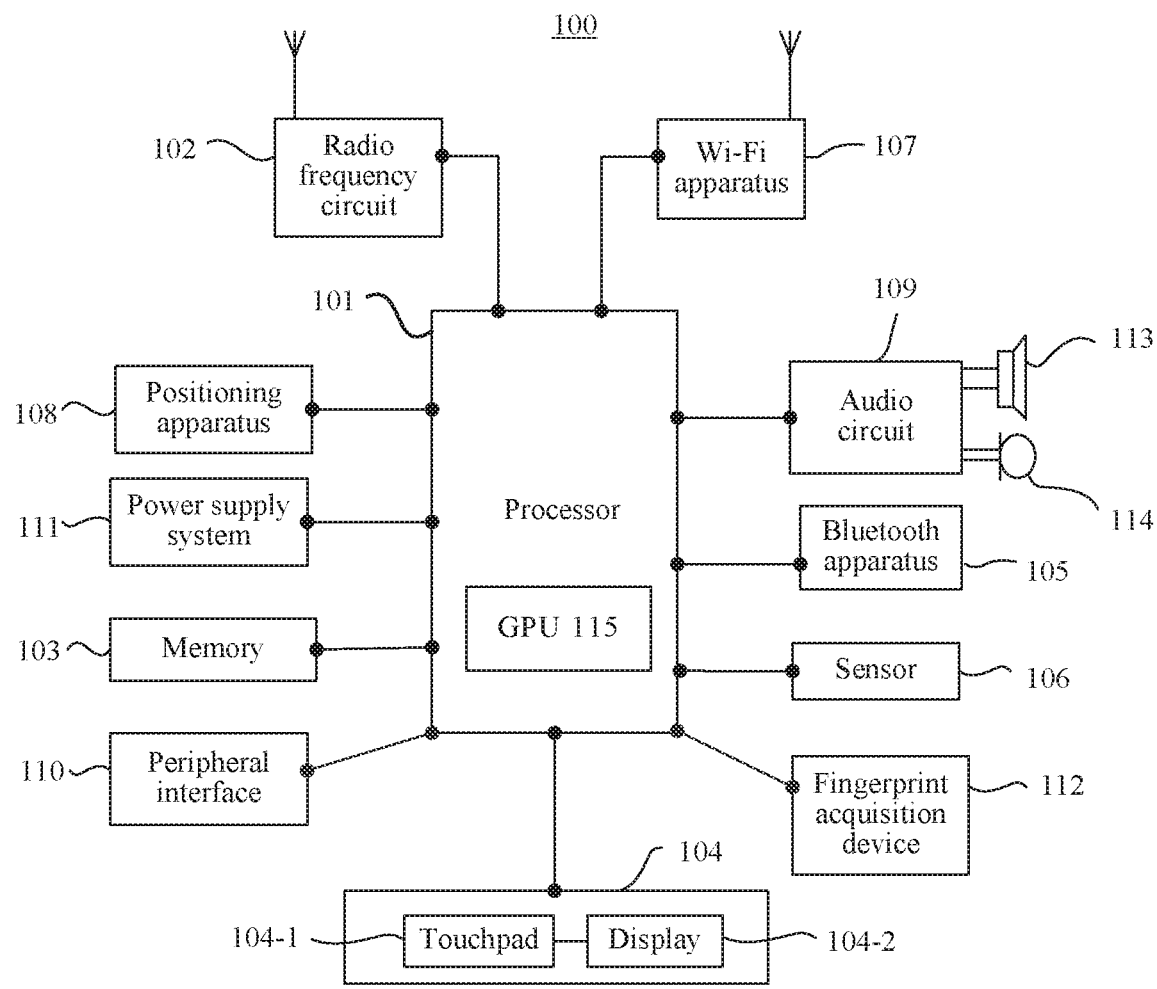
FIG. 1 is an architectural diagram of a terminal according to an embodiment of this application.

As shown in FIG. 1, a terminal according to an embodiment of this application may be a mobile phone 100. This embodiment is described below in detail by using the mobile phone 100 as an example. It should be understood that the mobile phone 100 shown in the figure is only an example of the terminal, and the mobile phone 100 may have more or fewer components than those shown in the figure, or two or more components may be combined, or different component configurations may be used.

As shown in FIG. 1, the mobile phone 100 may specifically include components such as a processor 101, a radio frequency (RF) circuit 102, a memory 103, a touchscreen 104, a Bluetooth apparatus 105, one or more sensors 106, a Wi-Fi apparatus 107, a positioning apparatus 108, an audio circuit 109, a peripheral interface 110, and a power supply system 111. These components may communicate with each other by using one or more communications buses or signal lines (not shown in FIG. 2). A person skilled in the art may understand that a hardware structure shown in FIG. 2 does not constitute a limitation on the mobile phone, and the mobile phone 100 may include more or fewer components than those shown in the figure, or some components may be combined, or different component arrangements may be used.

The components of the mobile phone 100 are described below in detail with reference to FIG. 1.

The processor 101 is a control center of the mobile phone 100, and is connected to various parts of the mobile phone 100 by using various interfaces and lines. By running or executing an application program stored in the memory 103 and invoking data stored in the memory 103, the processor 101 performs various functions and data processing of the mobile phone 100. In some embodiments, the processor 101 may include one or more processing units. For example, the processor 101 may be the Kirin 960 chipset manufactured by Huawei Technologies Co., Ltd. In some embodiments of this application, the processor 101 may further include a fingerprint authentication chip, configured to authenticate an acquired fingerprint.

In this embodiment of the present invention, the processor 101 may further include a graphics processing unit (Graphics Processing Unit, GPU) 115. The GPU 115 is a microprocessor dedicated to image computation work on a personal computer, a workstation, a game console, and some mobile devices example, a tablet computer, and a smartphone). The GPU 115 may convert and drive display information required by the mobile phone 100, provide a line scan signal to a display 104-2, and control correct display of the display 104-2.

Specifically, in a display process, the mobile phone 100 may send a corresponding drawing command to the GPU 115. For example, the drawing command may be "draw a rectangle whose length is a and whose width is b at a coordinate position (x, y)". In this case, the GPU 115 may rapidly compute all pixels of the graphic based on the drawing command, and draw the corresponding graphic at a designated position on the display 104-2.

It should be noted that the GPU 115 may be integrated in the processor 101 in the form of a functional module or may be disposed in the mobile phone 100 in an independent entity form (for example, a graphics card). This embodiment of the present invention is not limited thereto in any way.

The radio frequency circuit 102 may be configured to receive and send a radio signal during information receiving and sending or a call. In particular, the radio frequency circuit 102 may receive downlink data of a base station and then deliver the downlink data to the processor 101 for processing. In addition, the radio frequency circuit 102 sends uplink-related data to the base station. Usually, the radio frequency circuit includes, but is not limited to, an antenna, at least one amplifier, a transceiver, a coupler, a low noise amplifier, and a duplexer. In addition, the radio frequency circuit 102 may further communicate with another device by means of wireless communication. The wireless communication may use any communication standard or protocol, which includes, but is not limited to, global system for mobile communications, a general packet radio service, code division multiple access, wideband code division multiple access, long term evolution, email, and a short messaging service.

The memory 103 is configured to store the application program and the data. The processor 101 runs the application program and the data that are stored in the memory 103 and performs various functions and data processing of the mobile phone 100. The memory 103 mainly includes a program storage area and a data storage area. The program storage area may store an operating system, an application program required by at least one function (such as a sound playing function or an image playing function). The data storage area may store data (such as audio data and an address book) created based on use of the mobile phone 100. In addition, the memory 103 may include a high-speed random-access memory (RAM), and may further include a non-volatile memory such as a magnetic disk storage device or a flash memory device, or another volatile solid storage device. The memory 103 may store various operating systems, for example, an iOS® operating system developed by Apple Inc. and an Android® operating system developed by Google Inc. The memory 103 may be independent and is connected to the processor 101 by using the communications bus. The memory 103 may be integrated with the processor 101.

The random-access memory in the mobile phone 100 may also be referred to as memory or running memory. When applications installed on the mobile phone 100 are run, memory needs to be occupied to run programs related to the applications. Therefore, when there is larger memory, more applications may be simultaneously run on the mobile phone 100, the applications may be run faster, and it may be faster to switch between different applications.

In this embodiment of the present invention, the mobile phone 100 has fixed memory, and to prevent a background application running in the background from occupying excessive memory of the mobile phone, when a foregound application is switched to run in the background on the mobile phone 100, memory occupied by the application may be partially or completely freed to reduce the memory occupied by the application after the application is switched to the background, to increase running memory that the mobile phone 100 may actually use, thereby improving running speed of the applications on the terminal.

The touchscreen 104 may specifically include a touchpad 104-1 and the display 104-2.

The touchpad 104-1 may acquire a touch event of a user of the mobile phone 100 on or near the touchpad 104-1 (for example, an operation of the user on or near the touchpad 104-1 by using any suitable object such as a finger or a stylus), and send acquired touch information to another device (for example, the processor 101). The touch event of the user near the touchpad 104-1 may be referred to as a floating touch. With the floating touch, the user does not need to directly touch the touchpad to select, move or drag a target (for example, an icon), but instead, the user only needs to be near the terminal to perform a desired function. In addition, the touchpad 104-1 may be implemented by using touch panels of a plurality of types such as a resistive type, a capacitive type, an infrared type, and a surface acoustic wave type.

The display (which is also referred to as a display screen) 104-2 may be configured to display information input by the user or information provided for the user, and various menus of the mobile phone 100. The display 104-2 may be configured by using a liquid crystal display, an organic light-emitting diode, or the like. The touchpad 104-1 may cover the display 104-2. After detecting a touch event on or near the touchpad 104-1, the touchpad 104-1 transfers the touch event to the processor 101, to determine a type of the touch event. Subsequently, the processor 101 may provide a corresponding visual output on the display 104-2 based on the type of the touch event. Although, in FIG. 2, the touchpad 104-1 and the display screen 104-2 are used as two independent components to implement input and output functions of the mobile phone 100, in some embodiments, the touchpad 104-1 and the display screen 104-2 may be integrated to implement the input and output functions of the mobile phone 100. It may be understood that the touchscreen 104 is formed by stacking a plurality of layers of material. Only the touchpad (layer) and the display screen (layer) are shown in this embodiment of this application, and other layers are not recorded in this embodiment of this application. In addition, the touchpad 104-1 may be configured in the front of the mobile phone 100 in the form of a full panel. The display screen 104-2 may also be configured in the front of the mobile phone 100 in the form of a full panel. In this way, a bezel-less structure can be implemented in the front of the mobile phone.

In addition, the mobile phone 100 may further have a fingerprint recognition function. For example, a fingerprint reader 112 may be configured in the rear (for example, below a rear-facing camera) of the mobile phone 100, or a fingerprint reader 112 is configured in the front (for example, below the touchscreen 104) of the mobile phone 100, in another example, a fingerprint acquisition device 112 may be configured in the touchscreen 104 to implement the fingerprint recognition function. To be specific, the fingerprint acquisition device 112 may be integrated with the touchscreen 104 to implement the fingerprint recognition function of the mobile phone 100. In this case, the fingerprint acquisition device 112 is configured in the touchscreen 104, and may be a part of the touchscreen 104, or may be configured in the touchscreen 104 in another manner. A main component of the fingerprint acquisition device 112 in this embodiment of this application is a fingerprint sensor. Any type of sensing technology may be used for the fingerprint sensor, and includes, but is not limited to, an optical sensing technology, a capacitive sensing technology, a piezoelectric sensing technology or an ultrasonic wave sensing technology.

The mobile phone 100 may further include the Bluetooth apparatus 105, configured to implement data exchange between the mobile phone 100 and another terminal (for example, a mobile phone and a smartwatch) within a short range. The Bluetooth apparatus in this embodiment of this application may be an integrated circuit or a Bluetooth chip.

The mobile phone 100 may further include at least one sensor 106, such as an optical sensor, a motion sensor, and another sensor. Specifically, the optical sensor may include an ambient light sensor and a proximity sensor. The ambient light sensor can adjust brightness of a display of the touchscreen 104 based on brightness of ambient light, and the proximity sensor can turn off a power supply of the display when the mobile phone 100 is moved to an ear. As one type of motion sensor, an acceleration sensor may detect magnitude of accelerations in various directions (generally on three axes), may detect magnitude and a direction of a gravity when static, and may be applied to a mobile phone posture recognition application (such as switching between horizontal and vertical screens, a related game, and magnetometer posture calibration), a function related to vibration recognition (such as a pedometer and a knock), and the like. Other sensors such as a gyroscope, a barometer, a hygrometer, a thermometer, and an infrared sensor, which may be configured in the mobile phone 100, are not further described herein.

The Wi-Fi apparatus 107 is configured to provide the mobile phone 100 with network access following Wi-Fi related standards and protocols. The mobile phone 100 may be connected to a Wi-Fi access point by using the Wi-Fi apparatus 107, to help the user to receive and send emails, browse a webpage, access streaming media, and the like, which provides wireless broadband Internet access to the user. In some other embodiments, the Wi-Fi apparatus 107 may also be used as a Wi-Fi wireless access point or may provide Wi-Fi network access to other terminals.

The positioning apparatus 108 is configured to provide a geographical position to the mobile phone 100. It may be understood that the positioning apparatus 108 may be specifically a receiver of a positioning system such as the global positioning system (GPS), the BeiDou navigation satellite system, or the Russian GLONASS. After receiving the geographical position sent by the positioning system, the positioning apparatus 108 sends the information to the processor 101 for processing, or sends the information to the memory 103 for storage. In some other embodiments, the positioning apparatus 108 may further be a receiver of an assisted global satellite positioning system (AGPS). The AGPS is used as an assisted server to assist the positioning apparatus 108 in complete ranging and positioning services. In this case, an assisted positioning server communicates with a terminal such as the positioning apparatus 108 (that is, a GPS receiver) of the mobile phone 100 by using a wireless communications network to assist in positioning. In some other embodiments, the positioning apparatus 108 may be a positioning technology based on Wi-Fi access points. Each Wi-Fi access point has a globally unique MAC address. If Wi-Fi on the terminal is turned on, broadcast signals of Wi-Fi access points around the terminal may be scanned and collected. Therefore, MAC addresses broadcast by the Wi-Fi access points may be obtained. The terminal sends, to a positioning server by using the wireless communications network, data (for example, the MAC addresses) that can represent the Wi-Fi access points. The positioning server finds geographical positions of the Wi-Fi access points, computes a geographical position of the terminal by combining the intensity of Wi-Fi broadcast signals, and sends the geographical position of the terminal to the positioning apparatus 108 of the terminal.

The audio circuit 109, a speaker 113, and a microphone 114 may provide an audio interface between the user and the mobile phone 100. The audio circuit 109 may convert received audio data into an electrical signal and transmit the electrical signal to the speaker 113. The speaker 113 converts the electrical signal into a sound signal for output. In addition, the microphone 114 converts an acquired sound signal into an electrical signal. The audio circuit 109 receives the electrical signal, converts the electrical signal into audio data, and outputs the audio data to the RF circuit 102 to send the audio data to, for example, another mobile phone, or outputs the audio data to the memory 103 for further processing.

The peripheral interface 110 is configured to provide various interfaces to external input/output devices (such as a keyboard, a mouse, an external display, an external memory, and a subscriber identity module). For example, the mouse is connected by using a universal serial bus (USB) interface, and a subscriber identity module (SIM) card provided by a telecommunications operator is connected by using a metal contact on a subscriber identity module slot. The peripheral interface 110 may be configured to couple the external input/output peripheral devices to the processor 101 and the memory 103.

The mobile phone 100 may further include a power supply apparatus 111 (for example, a battery and a power management chip) for supplying power to the components. The battery may be logically connected to the processor 101 by using the power management chip, thereby implementing functions such as charging, discharging, and power consumption management by using the power supply apparatus 111.

Although not shown in FIG. 1, the mobile phone 100 may further include a camera (a front-facing camera and/or a rear-facing camera), a flash, a micro projection apparatus, a near-field communication (NFC) apparatus, and the like. Details are not described herein.

Figure 15:
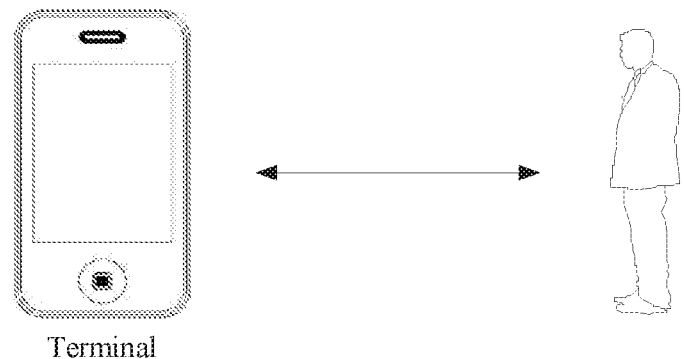
FIG. 15 is a schematic diagram of an application scene according to an embodiment of this application.

The terminal shown in FIG. 1 may be applied to FIG. 15. FIG. 15 is a schematic diagram of interactive control between a terminal and a user according to the present invention. The interactive control is performed between the terminal and the user. The terminal acquires inputs, physiological feature parameters, and the like of the user, processes data, and generates decisions to provide a result of interactive decision making. When performing interactive control, the terminal mainly has three functional stages: a data source acquisition stage of obtaining feature data, a data processing stage of analyzing the feature data, and an interactive decision-making stage of performing interactive control, based on a processing result. It should be noted that in the document of this application, the terms such as a terminal, an interactive terminal, an interactive control terminal, and a mobile terminal may specifically refer to an intelligent terminal such as VR glasses, an in-vehicle device, and a mobile phone.

Figure 2:
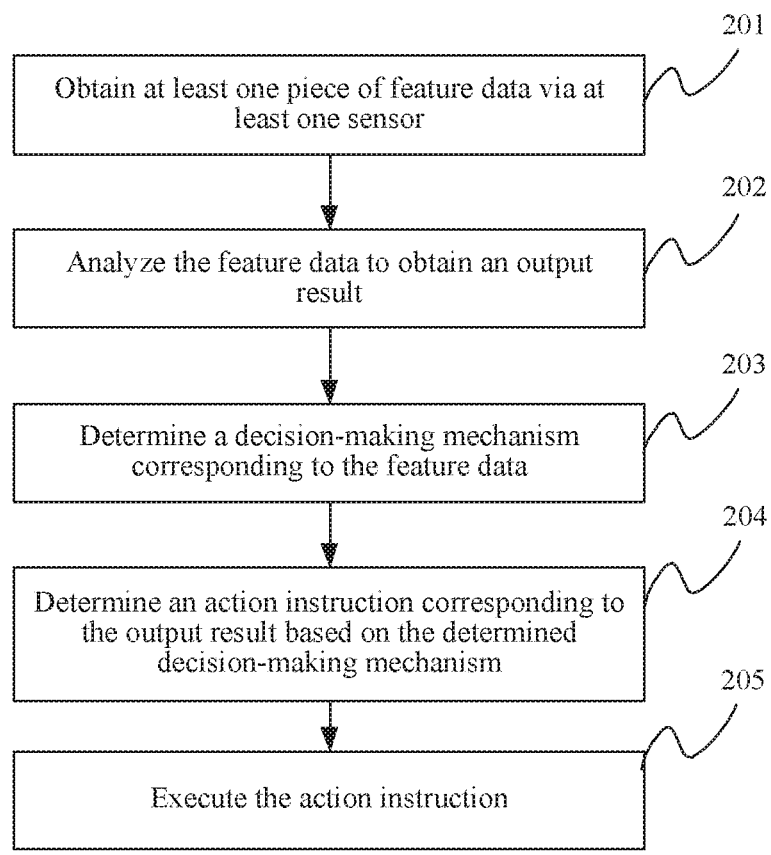
FIG. 2 is a flowchart of a control method according to an embodiment of this application.

FIG. 2 is a specific flowchart of a control method used by an interactive control terminal to implement interactive control. As shown in the figure, the control method may include the following steps.

Step 201: Obtain at least one piece of feature data using at least one sensor.

Step 201 is a data source acquisition stage of the interactive control terminal, and may be specifically implemented by using a plurality of hardware sensors. These sensors may be disposed at fixed positions or sworn by a user, and are configured to implement accurate sensing and acquire accurate feature data, which is obtained by the interactive control terminal in this application.

Figure 3:
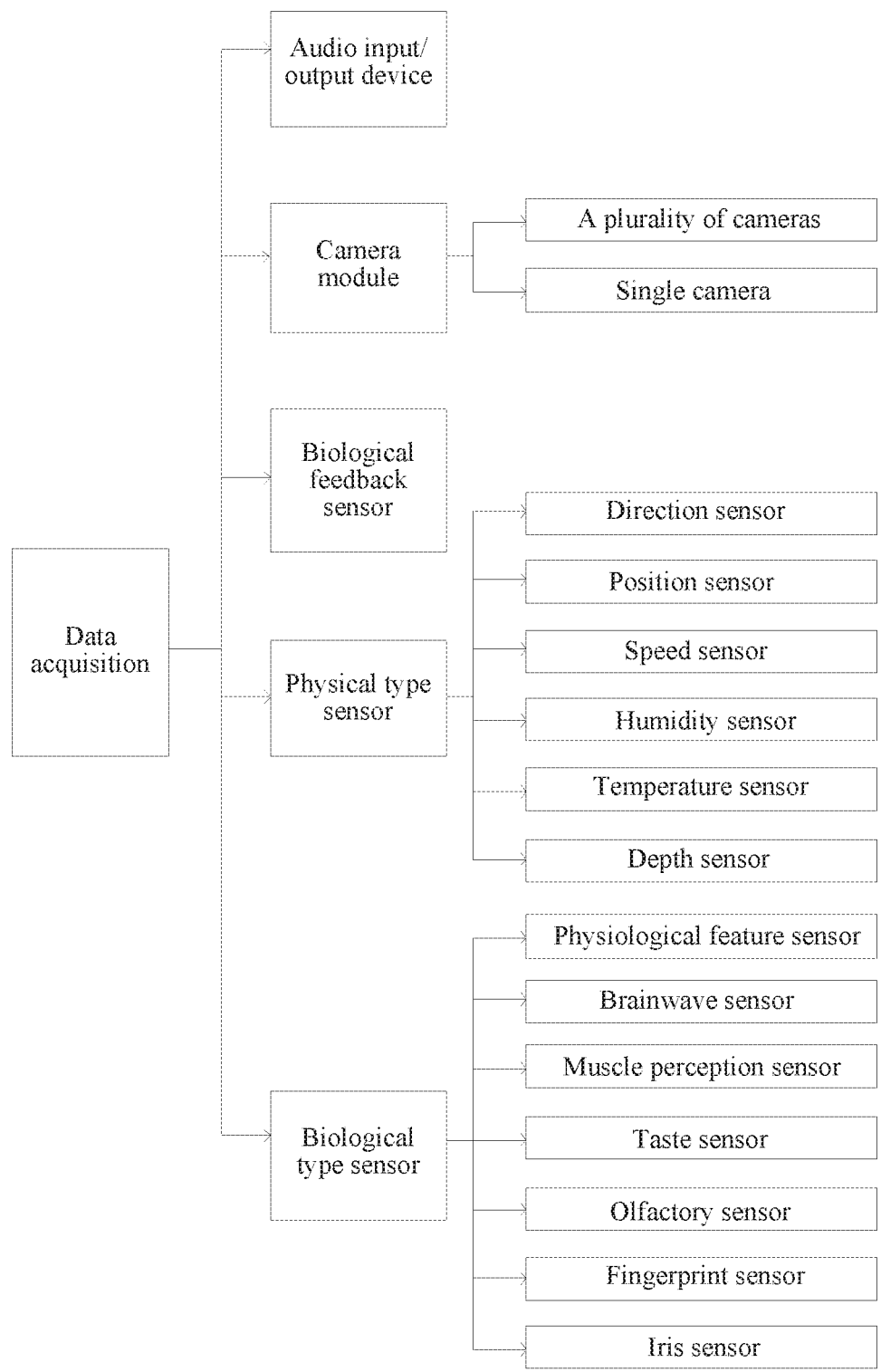
FIG. 3 is a diagram showing an application example according to an embodiment of this application.

When the terminal acquires data by using the hardware sensors, the hardware sensors mainly include the sensors shown in FIG. 3: a biological type sensor, a physical type sensor, a biological feedback sensor, an image acquisition module, and audio and video input/output devices, and the like. One or more of these sensors are used to obtain feature data in this application.

In an implementation, the biological type sensor may include one or more sensors in the following to obtain biological feature data of a corresponding user:

an iris sensor, worn on the head of the user or disposed at a fixed position, and configured to acquire an iris image of the user, where the iris sensor may be specifically an iris camera or the like;

a fingerprint sensor, configured to acquire fingerprint data of the user, where the fingerprint sensor may be specifically a fingerprint acquisition device;

an olfactory sensor, configured to provide the user with odor data samples of various odors to recognize an odor perceived by the user;

a taste sensor, configured to provide the user with various taste data samples such as "sourness, sweetness, bitterness, spiciness, and saltiness" of substances such as food to recognize a flavor perceived by the user;

a muscle perception sensor, bonded or tied at a muscle such as biceps of the user, and configured to: sense a muscle movement of the user, for example, acquire muscle movement data of the user, and convert the muscle movement data into electrical signal data to represent a muscle movement status of the user;

a brainwave sensor, attached to the head of the user, and configured to: acquire brainwave data of the user, and output the brainwave data, where the brainwave sensor may be specifically a brainwave chip or the like; and a physiological feature sensor, configured to acquire various biomarker data of the user, where the physiological feature sensor may be specifically: a blood pressure sensor (tied to an arm of the user), a heart rate sensor (disposed at the neck or a finger of the user), a respiratory rate sensor (a sensor that can sense a respiratory rate of the user and convert the respiratory rate into a usable output signal), and the like.

In an implementation, the physical type sensor may include one or more sensors in the following to obtain environmental feature data and movement feature data of the user:

a depth sensor, configured to acquire image depth data;

a temperature sensor, configured to acquire temperature data of a surrounding environment;

a humidity sensor, configured to acquire humidity data of a surrounding environment;

a sound sensor, configured to acquire noise data in a surrounding environment;

a light sensor, configured to acquire light intensity data in a surrounding environment;

an air quality sensor, configured to acquire air quality data, for example, PM2.5 content, in a surrounding environment;

a speed sensor, configured to acquire various speed data of a target object such as the user, where the speed sensor may be specifically a linear speed sensor, an angular speed sensor or the like;

a position sensor such as a global positioning system (Global Positioning System, GPS), a BeiDou navigation satellite system (BeiDou Navigation Satellite System, BDS), and the like, configured to acquire position data of a target object, where the position sensor may be specifically a linear displacement sensor, an angular displacement sensor or the like; and a direction sensor, configured to acquire direction data.

The biological feedback sensor is mainly configured to generate simulated feedback data such as pressure feedback (feedback data after the user perceives pressure), vibration feedback, and simulated smell feedback of the user.

In an implementation, the image acquisition module may be understood as a camera module, which may be specifically implemented by using a single camera or a plurality of cameras, and is configured to acquire image data.

The audio and video input/output devices are mainly configured to acquire and present audio and/or video data.

Therefore, the feature data obtained via the sensors in this application may include one or more pieces of data in the following: iris image data, fingerprint data, odor data, flavor data, muscle movement status data, brainwave data, blood pressure data, heart rate data, respiratory rate data, image depth data, temperature data, humidity data, speed data, position data, direction data, image data, audio and video data, and the like.

It should be noted that the terminal and the sensors may be connected in a wireless connection manner such as Wi-Fi or Bluetooth, or, may be connected in a wired connection manner such as a serial port data line.

Step 202: Analyze the feature data to obtain an output result that can represent an interaction status.

For example, the input result is a result that can represent a current interaction status based on analysis of the feature data by the terminal. For example, the output result is data of game interaction between the user and a terminal mentioned in the foregoing tennis example, and includes a muscle movement status of the user, a brainwave activity status of the user, various biomarker statuses such as a heart rate status, a blood pressure status, and a respiratory status of the user, and the like. Alternatively, the input result is information that can represent a current interaction process or interaction conclusion based on analysis of the feature data by the terminal. For example, the output result is the interaction data mentioned in the foregoing driving example, and includes a position status, a moving direction, and a speed status of a target object, a temperature status, a humidity status, and the like in an environment.

The implementation of the analysis of the feature data in this embodiment may include a data source recognition and processing stage, a data learning stage, and a data correction stage. Feature data that is obtained previously is mainly preprocessed and corrected to provide an input basis for an interactive decision-making stage.

In the data source recognition and processing stage, algorithms such as a biological technology recognition algorithm, a biomedical analysis algorithm, and an image processing algorithm may be used in this application to perform processing such as data source recognition, data filtering, and data normalization on the feature data to obtain the output result. Image processing is used as an example. Processing such as color recognition, eyeball recognition and tracking, motion recognition, posture recognition, expression and microexpression recognition, and target tracking is performed on the feature data to obtain the output result.

In the data learning stage, machine learning theories may be used in this application to learn and memorize real-world scenes to provide auxiliary information for the subsequent data correction stage and the like.

In the data correction stage, the output result obtained in the data source recognition and processing stage is corrected based on the auxiliary information output in the data learning stage in this application, thereby improving accuracy of the output result. For example, an output result for which 3D scene simulation can be performed is intelligently corrected, thereby improving accuracy of a subsequently established 3D scene.

In an implementation, in this application, after original feature data is acquired using various sensors, data source recognition and categorization may be first performed on the feature data, to perform data processing on different feature data by using different data processing algorithms. For example, categorization is performed based on data types of feature data. Feature data of different data types is output to different data processing algorithms such as the biological technology recognition algorithm, the biomedical analysis algorithm, and the image processing algorithm (a color recognition algorithm, an eyeball recognition and tracking algorithm, a motion recognition algorithm, a posture recognition algorithm, an expression and microexpression recognition algorithm, and a target tracking algorithm).

Subsequently, processing such as data source recognition, data filtering (extraction), and data normalization (abstraction) is performed on different feature data by using corresponding data processing algorithms, to obtain the output result.

Next, data correction is performed on the output result by using the auxiliary information obtained through machine learning to output a corrected result as an input for the subsequent interactive decision-making stage.

In addition, the data output after data correction may also be used as a further data basis or material for the data learning stage, so that data learning may be further improved.

In addition, step 202 of analyzing the feature data may further include several stages such as a data storage stage, a data modeling stage, and a decision feedback stage.

In the data storage stage, various types of feature data acquired using the sensors are stored, and the result obtained after data learning and various historical information are stored, to provide data support for feedback of a subsequent decision-making mechanism.

In the data modeling stage and the decision feedback stage, a three-dimensional scene is reconstructed and enhanced based on the subsequent decision-making mechanism and the data obtained after data correction, to intelligently simulate various interaction elements in various types of scenes, and based on the data obtained in the data learning and the stored data, corresponding feedback is output for a decision-making result generated by the decision-making mechanism. To be specific, feedback information is provided to the user based on the decision-making result and the stored data.

In an implementation, during output of feedback is this embodiment, the feedback may be output to feedback sensors. The feedback sensors here are, for example, the various sensors in the foregoing.

Step 203: Determine a decision-making mechanism corresponding to the feature data.

The decision-making mechanism in this application may include a single-factor decision-making mechanism and a multi-factor decision-making mechanism. The single-factor decision-making mechanism may be an admission decision-making mechanism that acquires a feature of a user, an environmental perception decision-making mechanism, a biological feature decision-making mechanism that acquires a biological feature, a motion feature, a muscle reaction feature of a human, and the like. The admission decision-making mechanism is an admission mechanism that recognizes or authenticates an identity of the user.

The admission decision-making mechanism is a basis for other single-factor decision-making mechanisms and multi-factor decision-making mechanisms, and is, for example, basic decision making that performs interactive control determination on user identity authentication and the like, for example, performs interactive control determination by using a fingerprint recognition algorithm, an iris recognition algorithm, a face recognition algorithm, and the like. The environmental perception decision-making mechanism is a decision-making mechanism that performs interactive control determination based on elements in a surrounding environment of the user, for example, performs interactive control determination by using a physical feature extraction technology, a biological recognition technology, and an image recognition processing technology. The biological feature decision-making mechanism is a decision-making mechanism that performs interactive control determination based on a biomarker or feature of the user, for example, performs interactive control determination by using a biological recognition technology, and the like.

The physical feature extraction technology may include: a parallel map matching algorithm based on physical features of images, an algorithm for topological simplification of a planar flow field based on physical features, and the like. The physical biological recognition technology may include: a recognition algorithm based on template matching, a multimodal biological feature recognition algorithm based on coefficient identifiers, and a biological feature recognition algorithm based on feature fusion, and the like. The image recognition processing technology may include: a wavelet-based image matching algorithm, an image local feature extraction algorithm, a binocular matching and fusion algorithm, and a binocular ranging/speed measuring algorithm, and the like.

The multi-factor decision-making mechanism is a decision-making mechanism that is based on single-factor decision-making mechanisms and that is obtained by using complex logic to implement any combination of a plurality of single-factor decision-making mechanisms, and is, for example, an intelligent simulation and interaction decision-making mechanism formed by an admission decision-making mechanism, an environmental perception decision-making mechanism, and a biological feature decision-making mechanism, an intelligent living decision-making mechanism formed by an admission decision-making mechanism and a biological feature decision-making mechanism, and the like.

Step 204: Determine an action instruction corresponding to the output result based on the determined decision-making mechanism.

Specifically, several scenes in the following may be included:

First, the terminal is controlled, based on at least a part of the environmental feature data, or, based on at least a part of the environmental feature data and at least a part of the biological feature data, to enter a target working mode. The target working mode is a specific scene that the terminal enters after executing an instruction, and a corresponding function is performed in the scene, and is, for example, a game mode (the user plays a game in the scene), a navigation mode (navigation is performed in the scene), a driving mode (the user drives a car in the scene, and the terminal intelligently prompts related information), a VR game mode (the user plays a game in a VR environment), and a friend connection mode (the user interacts with a friend on a social APP in this mode).

Second, the terminal is controlled, based on at least a part of the environmental feature data, or, based on at least a part of the environmental feature data and at least a part of the biological feature data, to display a current movement picture, so that the movement picture that is currently displayed by the terminal can be adjusted in real time based on operation behavior of the user and an environment of the user. For example, it suddenly rains outside when the user plays a game, and in this case, the movement picture currently displayed by the terminal may be adjusted to a rainy scene, so that the user can be immersed in the game more deeply.

Third, the terminal is controlled, based on at least a part of the environmental feature data or based on at least a part of the environmental feature data and at least a part of the biological feature data, to prompt road driving information, so that the user can acquire a road condition for driving, a weather, a current status of the user, and the like in time. For details, refer to the example in the foregoing driving scene.

Fourth, environmental status information is obtained at least based on temperature data, humidity data, image data, image depth data, direction data, and position data in the feature data, where the environmental status information includes: object element information and comfort level information in an environment; and the terminal is controlled, based on the object element information and the comfort level information in the environment, to prompt environment related information. For details, refer to the following embodiments.

Fifth, biological status information is obtained at least based on muscle movement status data, brainwave data, and face image data in the feature data, where the biological status information includes at least biological movement status information and biological emotion status information; and the terminal is controlled, based on the biological movement status information and the biological emotion status information, to display biological feature related information. For details, refer to the following embodiments.

Step 205: Execute the action instruction.

For example, in a sport scene, after feature data such as muscle status data and image data when a user is hitting a tennis ball is acquired, and an output result and a corresponding decision-making mechanism are obtained based on the feature data. The decision-making mechanism is, for example, a multi-factor decision-making mechanism formed by the biological feature decision-making mechanism and the admission decision-making mechanism, so that a corresponding action instruction is determined based on the output result such as ball hitting strength of the user, the speed, and direction of the tennis ball, and the like of the feature data. The action instruction may be used to control the tennis ball to move based on a movement trajectory, thereby implementing intelligent interaction.

After executing the action instruction, the terminal obtains an execution result. For example, after controlling the ball to move based on the movement trajectory, the terminal obtains status information of the ball hitting the ground or sound feedback after the user hits the ball, and the like, and provide feedback information to the user based on such an execution result and the stored data such as the data after learning and historical data. For example, based on the feedback information, the user learns about data that needs to be corrected, whether the data can be adjusted subsequently based on preference of the user, and the like.

It should be noted that in addition to the foregoing operations, the terminal may further prompt living information (for example, diet, routine, and the like) to the user; prompt work information to the user (for example, start and end time of work, and position); prompt information indicating that a friend comes online (for example, information indicating that a girlfriend comes online or goes offline) to the user; prompt data connection information (for example, handover from a cellular network to a Wi-Fi network) to the user; prompt game progress information (for example, a current set of a tennis match, a current level of a video game) to the user; control the terminal to prompt road condition information (for example, whether there is a slope, whether there is a construction site, and the like) to the user; prompt weather information to the user; remind the user to rest (for example, the user has played the game for an excessively long time); and present a three-dimensional virtual scene generated based on the environmental feature data (for example, construct virtual 3D scene to provide the user with better gaming experience).

Figure 4:
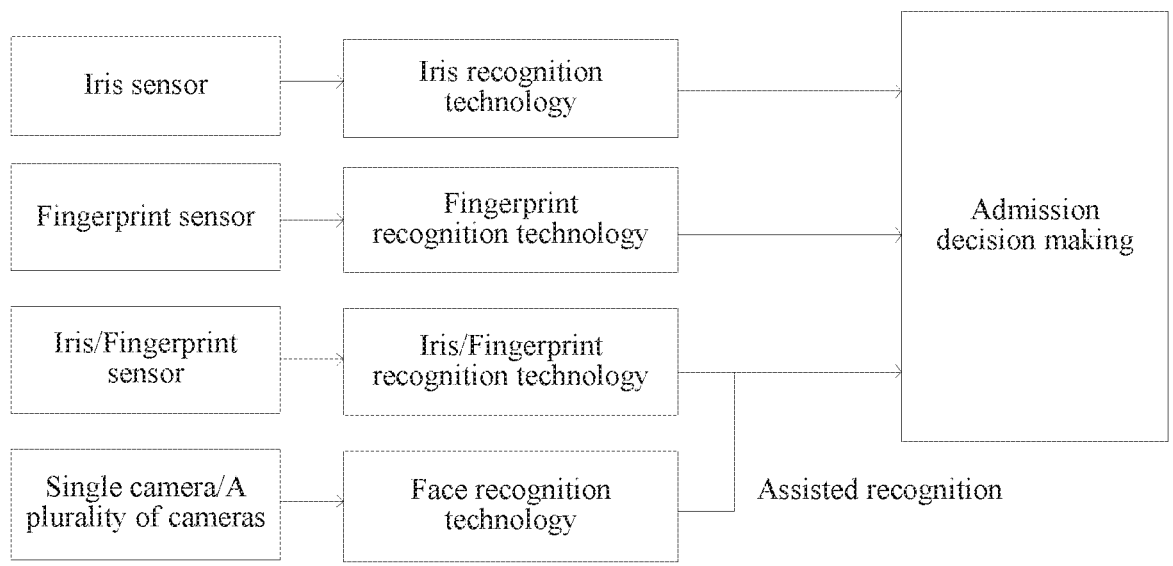
FIG. 4 is a diagram showing an application example according to an embodiment of this application.

FIG. 4 is a diagram showing a logic structure of an admission decision-making mechanism. As shown in the figure, the admission decision-making mechanism includes three manners: an iris recognition manner, a fingerprint recognition manner, and a manner that combines iris recognition, fingerprint recognition, and face recognition. The three manners and a determining mechanism of a combination thereof constitute admission decision-making mechanisms of an interactive control system in this application. It should be understood that the admission decision-making mechanism may be similar to the user identity authentication mentioned herein, and for the same or corresponding technical features, refer to description of the admission decision-making mechanism and description of the user identity authentication.

That is, in this application, feature data such as iris image data, fingerprint data, and face image data is acquired using hardware sensors such as an iris sensor, a fingerprint sensor, a single camera and/or a plurality of cameras, and the like. Operations such as recognition and preprocessing, learning, and correction are separately performed on the feature data by using a corresponding recognition technology such as an iris recognition technology, a fingerprint recognition technology, and a face recognition technology to obtain an output result, and determination is then performed on the output result based on an admission decision-making mechanism, to generate and execute an action instruction, thereby implementing intelligent interaction.

For example, in this application, one or more pieces of iris image data, fingerprint data, and face image data of the user are acquired. Iris recognition, fingerprint recognition, and face recognition are then performed to obtain an output result that can represent an identity of the user. After a decision-making mechanism for an identification function or a payment function is determined, an action instruction of whether to perform login or payment is determined based on the output result and the decision-making mechanism, to perform an action such as identity authentication or bill payment.

Figure 5:
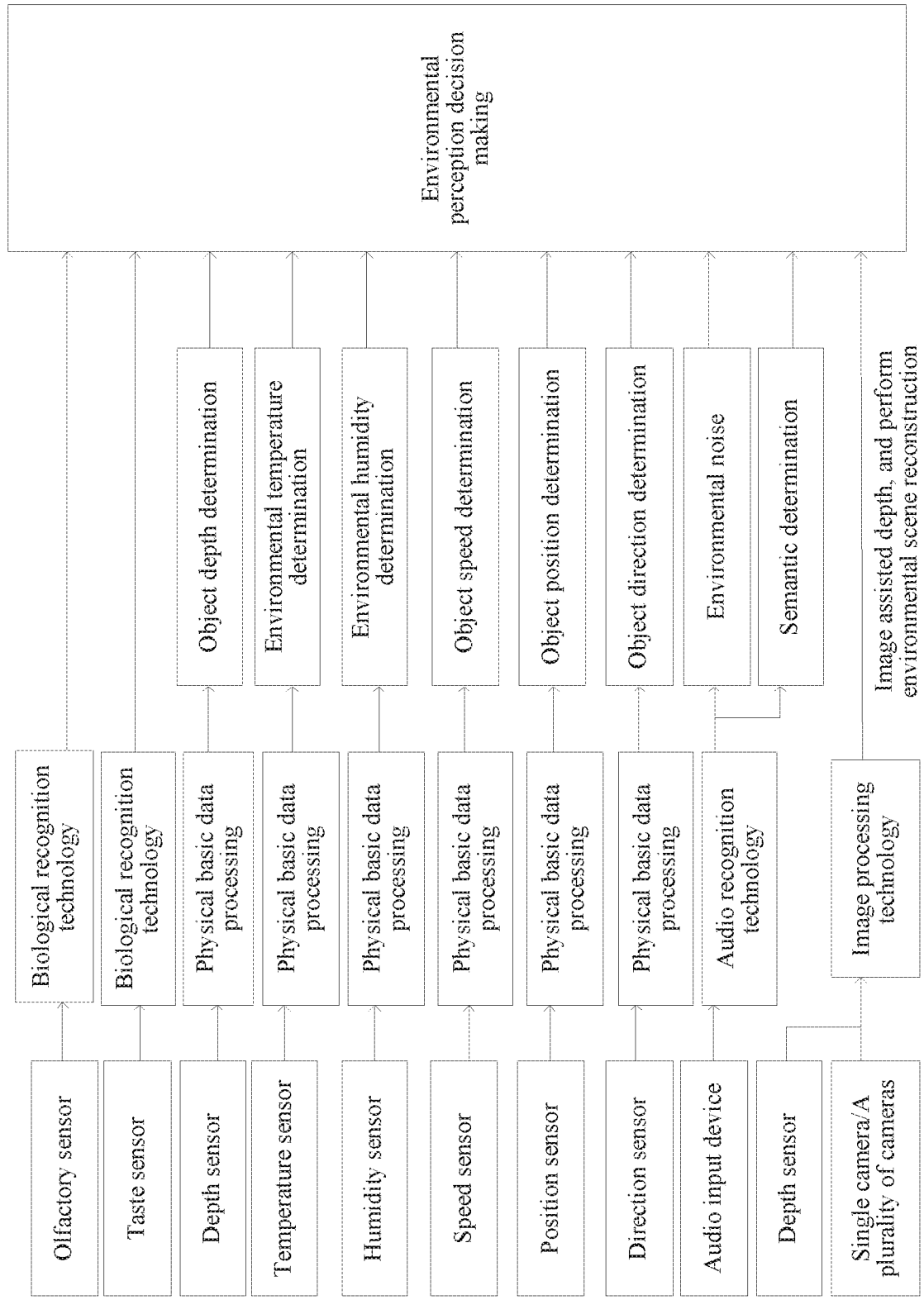
FIG. 5 is a diagram showing an application example according to an embodiment of this application.

FIG. 5 is a diagram showing a logic structure of an environmental perception decision-making mechanism. In the environmental perception decision-making mechanism, features of elements in a surrounding environment of a user are analyzed by using physical, biological, and image processing technologies, and the elements and a combination thereof constitute a complex environment to construct a perception decision-making mechanism. The following basic elements of the environment in environmental perception decision-making mechanism are determined based on various feature data:

a size, a contour, a position, and a direction of a basic element such as an object in the environment are determined by using image data, image depth data, direction data, and position data.

a movement status of an object in an environment is determined by using image data, image depth data, and speed data; and an environment comfort level index is determined by using temperature data, humidity data, odor data, and flavor data.

After the basic elements, movement statuses of the basic elements, and an environment comfort level index are combined into a relatively advanced determination basis, for example, predictive determination or emotional determination. To be specific, interactive control determination is performed based on a combination of the foregoing three aspects. For example, determination is performed based on a size, a contour, a position, and a direction of a basic object in an environment and by combining odor data and flavor data (for example, a restaurant may be determined based on objects of basic elements in the foregoing environment including many tables and chairs and a lot of food, and a good restaurant may be determined by combining odors).

That is, in this application, feature data such as odor data, flavor data, image depth data, temperature data, humidity data, speed data, position data, direction data, and audio and video data is acquired based on hardware sensors such as an olfactory sensor, a taste sensor, a depth sensor, a temperature sensor, a humidity sensor, a speed sensor, a position sensor, a direction sensor, an audio input device, a single camera, and a plurality of cameras. Feature data of basic elements in a surrounding environment of a user is then analyzed by using physical, biological, and image processing technologies. Operations such as recognition and preprocessing, learning, and correction are performed on the feature data to obtain output results. Determination is then performed on these output results based on the environmental perception decision-making mechanism, to generate and execute an action instruction to implement intelligent interaction.

For example, in this application, odor data, flavor data, image depth data, temperature data, humidity data, speed data, position data, direction data, and audio and video data, and the like of objects such as dining tables and dishes in a restaurant environment are acquired. Various feature data of dining tables, dining chairs, waiters, dishes, cooks, and the like in the restaurant environment are then analyzed by using physical, biological, and image processing technologies. Operations such as recognition, preprocessing, learning, and correction are then performed on the feature data to obtain output results. Three-dimensional simulation and reconstruction and determination using a decision-making mechanism are then performed on these output results to obtain a determination result of an excellent restaurant, to generate an instruction of displaying a restaurant menu and provide a user with an ordering interaction service.

Figure 6:
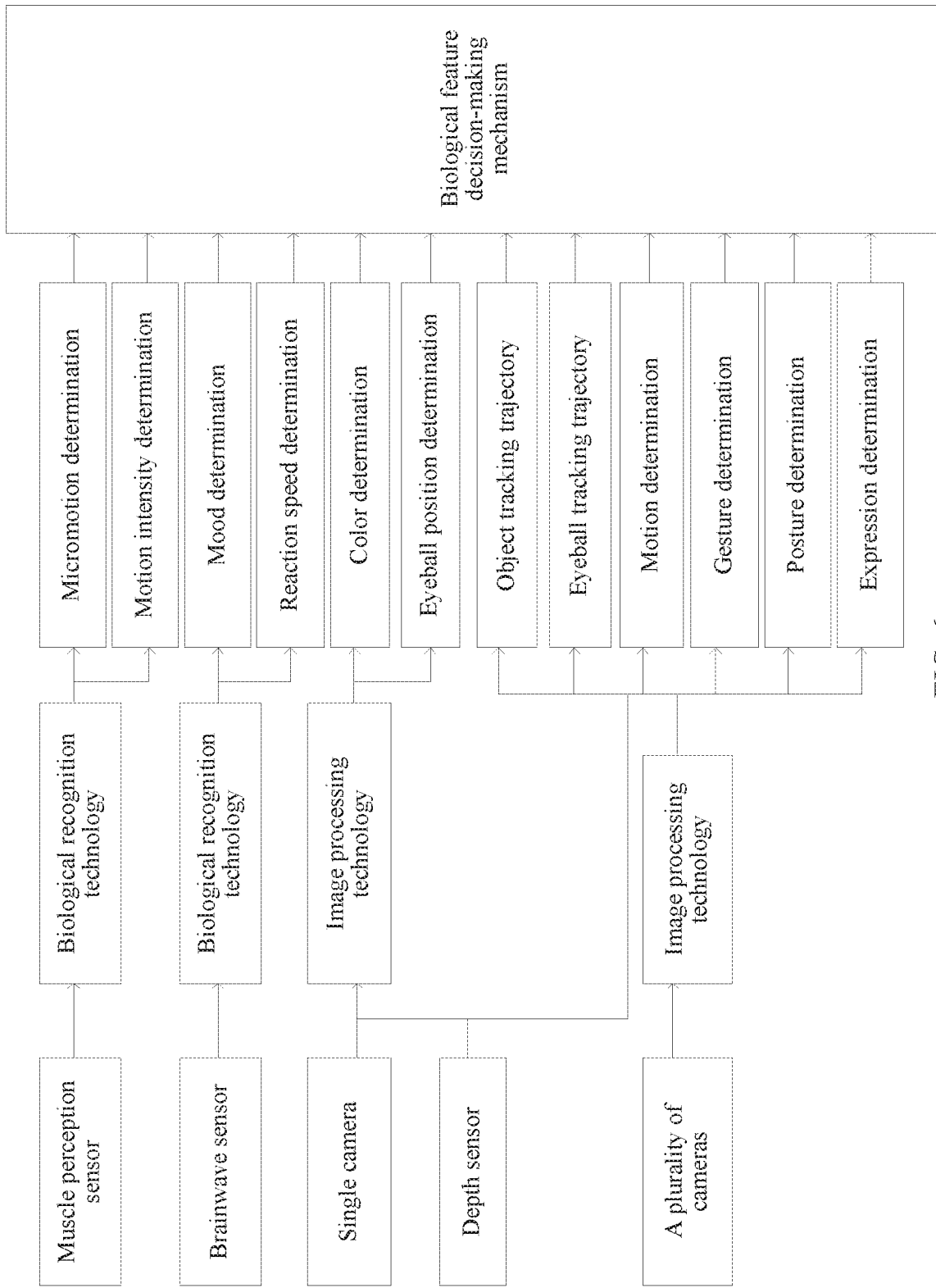
FIG. 6 is a diagram showing an application example according to an embodiment of this application.

FIG. 6 is a diagram showing a logic structure of a biological feature decision-making mechanism. The biological feature decision-making mechanism is a complex biological/physical feature decision-making mechanism in which biological and physical behavior patterns are analyzed by using biological and image processing technologies, various biological and physical feature elements are abstracted, and the various feature elements and combinations thereof are used. Basic elements of biological/physical features in the biological feature decision-making mechanism are separately identified by using muscle movement status data, brainwave data, image data, and image depth data, and are, for example, as follows:

A biological movement ability is determined by using data related to motion intensity, reaction speed, a motion, a posture, and the like in the foregoing data, and is a basis for intelligent simulation of a sport scene. For example, biological motion intensity is determined based on muscle movement status data; the biological reaction speed is determined based on the muscle movement status data and brainwave data; and the biological motion and posture are determined based on image data and image depth data.

Biological color preferences are determined based on data related to moods, colors, expressions, and the like in the foregoing data, and is a basis for intelligent simulation of a dining scene and a shopping scene. For example, biological moods and color preferences are determined based on brainwave data; and biological expressions are determined based on the image data.

A biological stress response speed is determined based on data related to micromotions, motion intensity, moods, eyeball trajectories, postures, expressions, and the like in the foregoing data, and is a basis for intelligent simulation of a sport scene, a game scene, an entertainment scene, and the like.

An object movement coefficient is determined based on data related to an object trajectory, an object speed, and the like in the foregoing data, and is a basis for a scene of intelligent simulation.

Biological habits are determined based on data related to motions, gestures, postures, expressions, micromotions, and the like in the foregoing data.

That is, in this application, feature data such as muscle movement status data, brainwave data, image data, and image depth data is acquired based on hardware sensors such as a muscle perception sensor, a brainwave sensor, a single camera, a depth sensor, and a plurality of cameras. Feature data of various biological/physical feature elements is then analyzed by using biological and image processing technologies such as micromotion determination, motion intensity determination, mood determination, reaction speed determination, color determination, eyeball position determination, object tracking trajectory determination, eyeball tracking trajectory determination, motion determination, gesture determination, posture determination, and expression determination. Operations such as recognition, preprocessing, learning, and correction are performed on the feature data to obtain output results. Determination is then performed on these output results on the biological feature decision-making mechanism to intelligently simulate a scene, for example, to simulate and reconstruct a ball hitting scene of a user, to generate and execute an action instruction, for example, generate an instruction of enabling a ball to move in a moving direction and at a moving speed. The instruction is used to display a movement status of a ball after the user hits the ball, thereby implementing intelligent interaction.

A multi-factor decision-making mechanism formed by combining two or more single-factor decision-making mechanisms is a decision-making mechanism that is based on single-factor decision-making mechanisms such as an admission decision-making mechanism, an environmental perception decision-making mechanism, and a biological feature decision-making mechanism and that is obtained by using complex logic to implement any combination of a plurality of single-factor decision-making mechanisms. Applications of the multi-factor decision-making mechanism are described below by using examples.

First, in this application, a multi-factor decision-making mechanism is established based on single-factor decision-making mechanisms to form an intelligent simulation and interaction decision-making system. Intelligent simulation and interaction are major development trends of next-generation intelligent devices and cover most scenes of people's daily life such as a sport scene, an entertainment scene, a video scene, a game scene, a shopping scene, and a dining scene.

Figure 7:
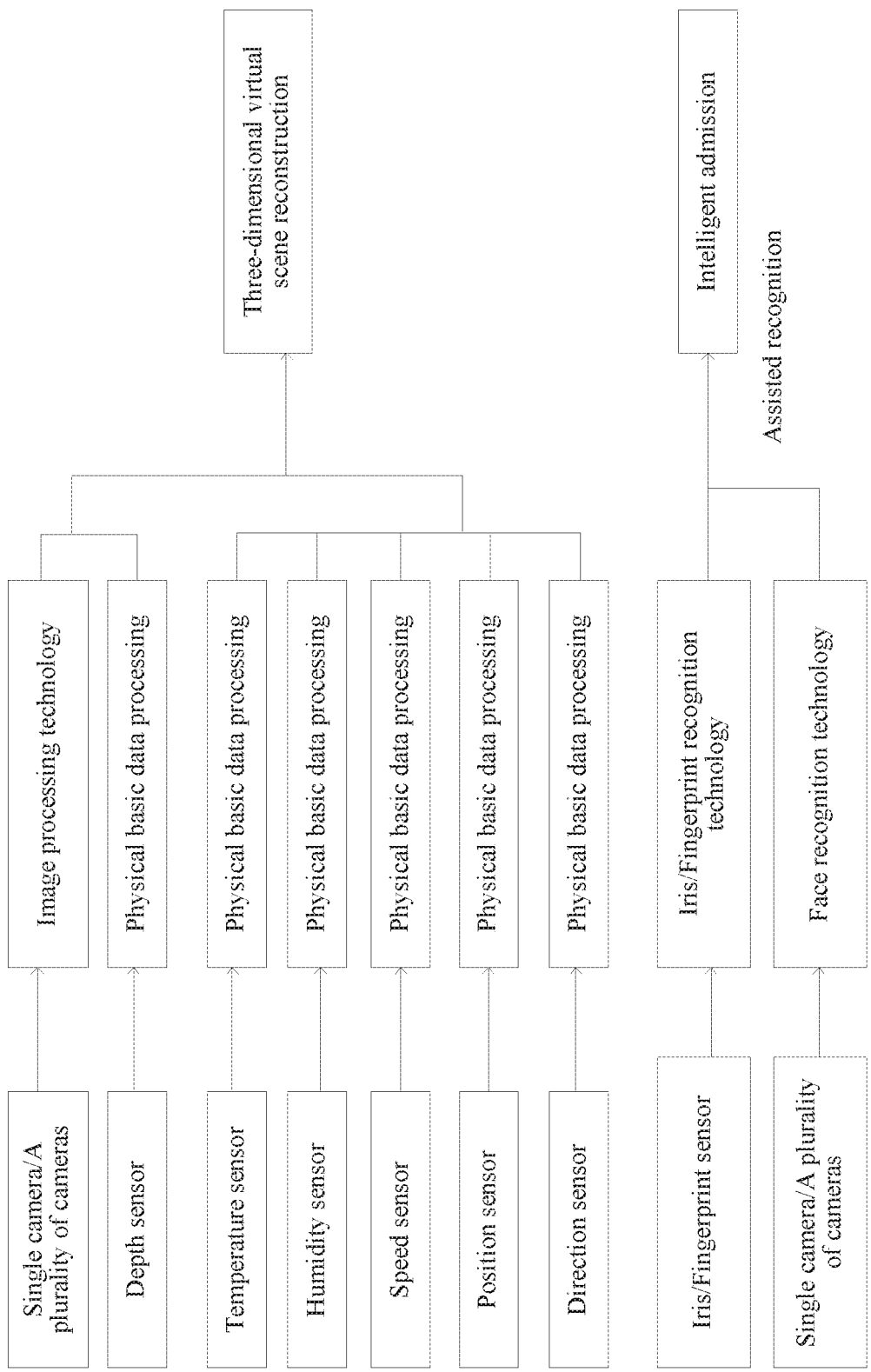
FIG. 7 is a diagram showing an application example according to an embodiment of this application.
Figure 8:
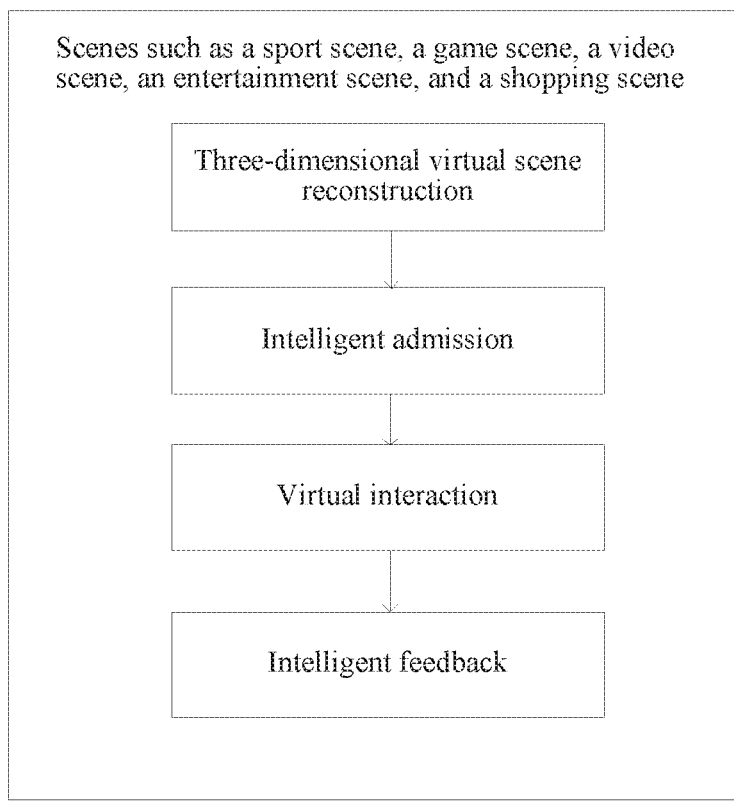
FIG. 8 is a diagram showing an application example according to an embodiment of this application.

In this embodiment, decision-making mechanisms used in the intelligent simulation and interaction decision-making system may include an admission decision-making mechanism and an environmental perception decision-making mechanism. As shown in FIG. 7, a single camera, a plurality of cameras, a depth sensor, a temperature sensor, a humidity sensor, a speed sensor, a position sensor, a direction sensor, an iris/fingerprint sensor, and the like may be disposed in an intelligent simulation interactive system, and further an image processing technology, a physical basis data processing technology, an iris/fingerprint recognition technology, and a face recognition technology, and the like are correspondingly used to implement functions such as three-dimensional virtual scene reconstruction, intelligent admission, virtual interaction, and intelligent feedback, as shown in FIG. 8. For the virtual scene reconstruction, a high-performance, high quality 3D virtual scene is constructed by using complex determination. For the intelligent admission, a user enters a virtual scene after being authenticated by an identity admission system. For the virtual interaction, a powerful biological/physical feature decision-making mechanism ensures accurate and efficient interaction between a user and an environment. For the intelligent feedback, an assisted decision-making system provides intelligent feedback to enable a user to be immersed in a virtual interactive world.

The virtual scene reconstruction may include sport scene reconstruction, game scene reconstruction, video scene reconstruction, entertainment scene reconstruction, shopping scene reconstruction, and food scene reconstruction, and the like. Specifically, determination is then performed on reconstruction of a three-dimensional virtual scene based on output results obtained after feature data is analyzed and include:

recognizing types, sizes, positions and directions, textures or materials, statuses, and the like of scene elements such as scene objects, where for example, all or some of physical data such as image data, image depth data, position data, direction data, and speed data, and the like in the feature data are jointly used for determination to recognize the scene elements; and obtaining a scene environment parameter, where for example, all or some of temperature data, humidity data, and the like are jointly used for determination to obtain the scene environment parameter.

Figure 9A:
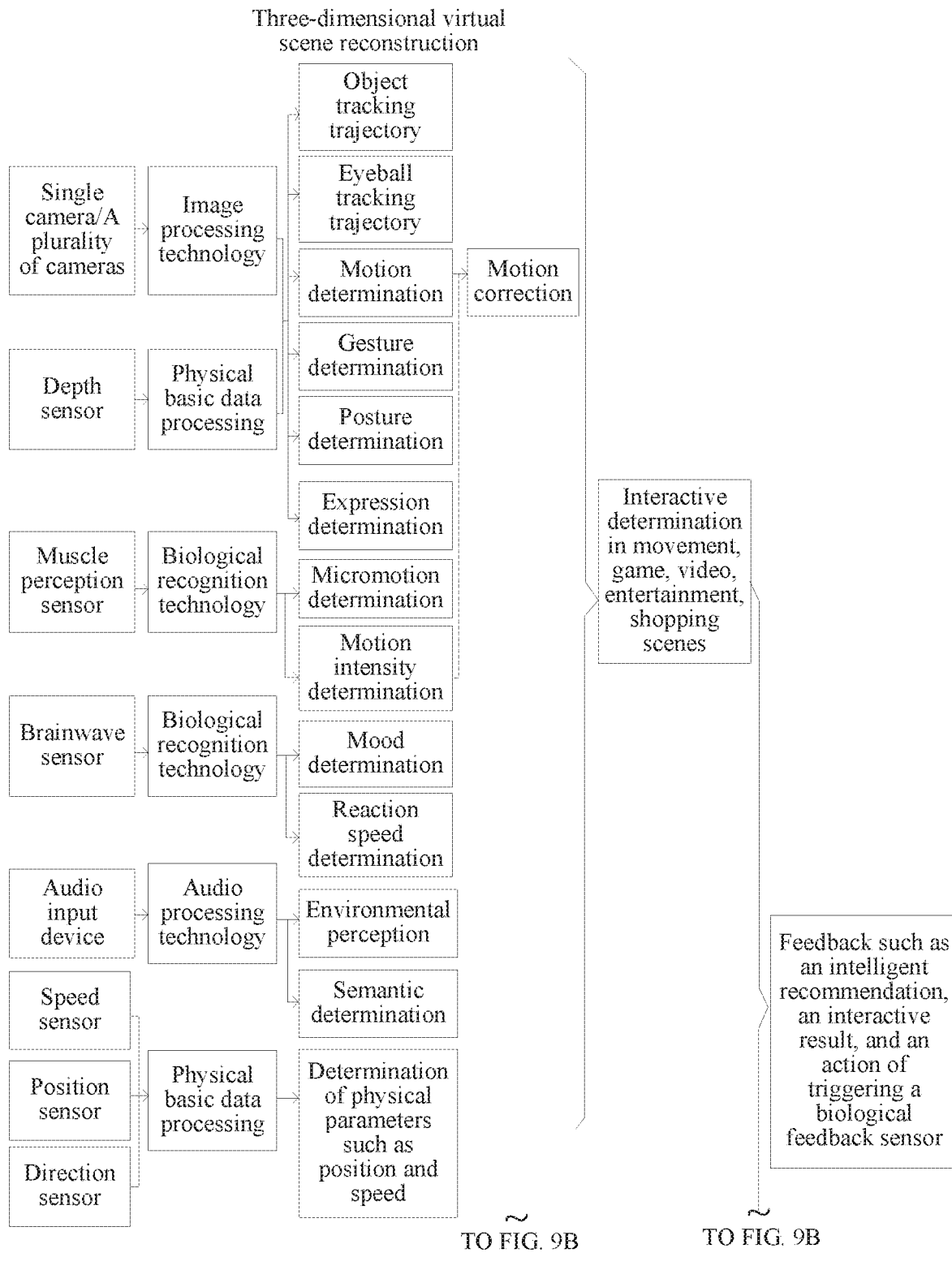
FIG. 9A and FIG. 9B are diagrams showing an application example according to an embodiment of this application.
Figure 9B:
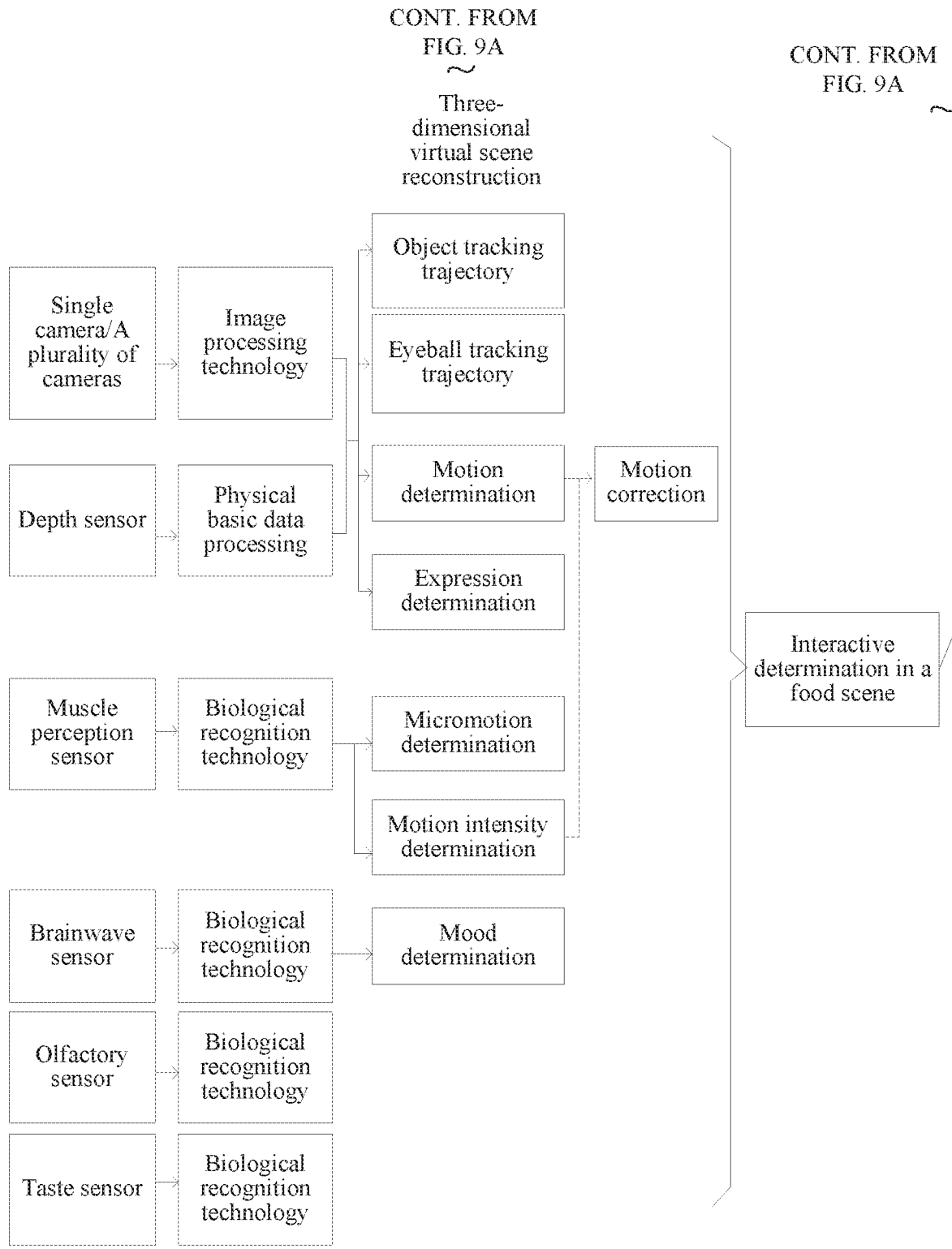

As shown in FIG. 9A and FIG. 9B:

In a sport scene, all or some of physical data such as image data, muscle movement status data, image depth data, direction data, position data, speed data, temperature data, and humidity data may be jointly used for determination to reconstruct a realistic sport scene, and generate and execute a corresponding action instruction to implement interactive control.

In a game scene (which involves game interaction movement, for example, a ball hitting scene for virtual reality glasses), all or some of physical data such as image data, muscle movement status data, brainwave data, image depth data, direction data, position data, speed data, temperature data, and humidity data may be jointly used for determination.

In an entertainment interaction scene of a real-world entertainment scene, all or some of physical data such as image data, muscle movement status data, brainwave data, image depth data, direction data, position data, speed data, temperature data, and humidity data may be jointly used for determination.

In a virtual scene of a physical object presentation model in a shopping scene, all or some of physical data such as image data, audio and video data, image depth data, direction data, position data, and speed data may be jointly used for determination.

In an item use interaction scene in a shopping scene, all or some of physical data such as image data, audio and video data, brainwave data, odor data, flavor data, image depth data, direction data, position data, and speed data may be jointly used for determination.

In a food scene, all or some of physical data such as image data, image depth data, muscle status data, brainwave data, odor data, and flavor data may be jointly used for determination.

In the independent virtual scenes or any combined virtual scene, after determination by using a decision-making mechanism, a corresponding action instruction is generated and executed to implement interactive control.

A result of the intelligent interactive control may trigger a biological feedback sensor and the like to perform simulation and reconstruction of an intelligent feedback scene. Specifically, all or some of components such as a biological sensor, a vibration sensor, audio and video input/output devices, and a data processor may be jointly used for determination, to reconstruct an intelligent feedback scene to provide feedback information for a corresponding virtual scene.

Second, in this application, a multi-factor decision-making system is used to form an intelligent living system to provide a user with optimal arrangements and recommendations to facilitate work and life of the user. The intelligent living system renders next-generation intelligent device fairly intelligent and covers scenes of work, life, among other aspects.

Figure 10:
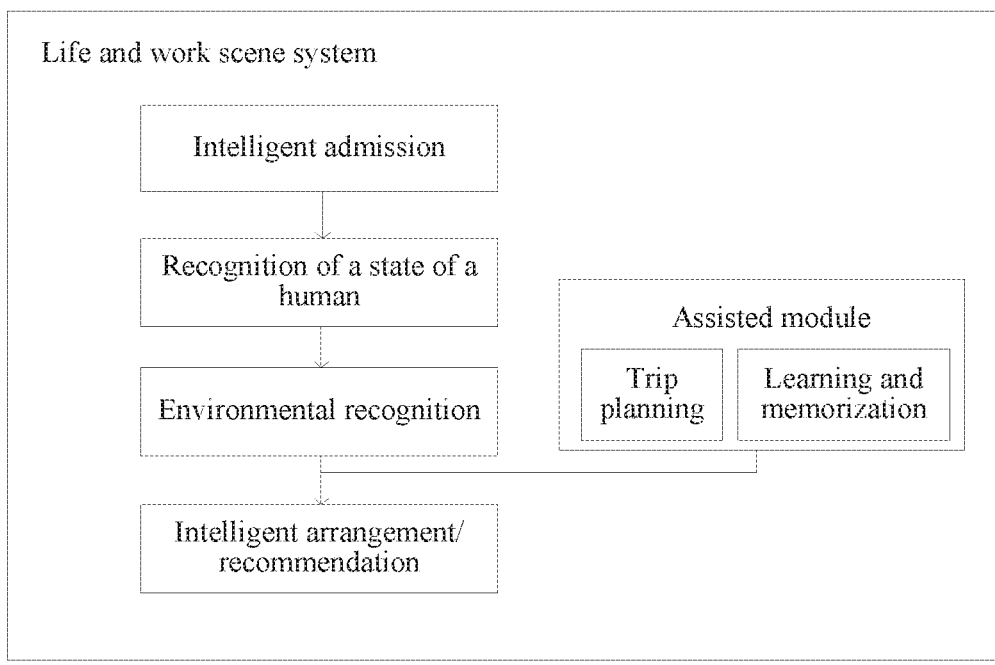
FIG. 10 is a diagram showing an application example according to an embodiment of this application.

Decision-making mechanisms used in the intelligent living system in this embodiment may include: an admission decision-making mechanism, a biological feature decision-making mechanism, and an environmental perception decision-making mechanism. As shown in FIG. 10, the intelligent living system may include: intelligent admission, human state recognition, environmental status recognition, trip planning, learning and memorization, and intelligent arrangement/recommendation. For the intelligent admission, the intelligent living system is started after a user is authenticated by an identity admission system. For the human status recognition, states of a human are recognized, and the states include a physiological state and a mental state. For the environmental status recognition, recognition of natural environment including wind, rain, thunder, lightning, and the like, a comfort level of a surrounding environment, and noise pollution and light pollution in an area, and the like. For the intelligent arrangement/recommendation, an assisted decision-making system makes optimal arrangements and recommendations.

Figure 11:
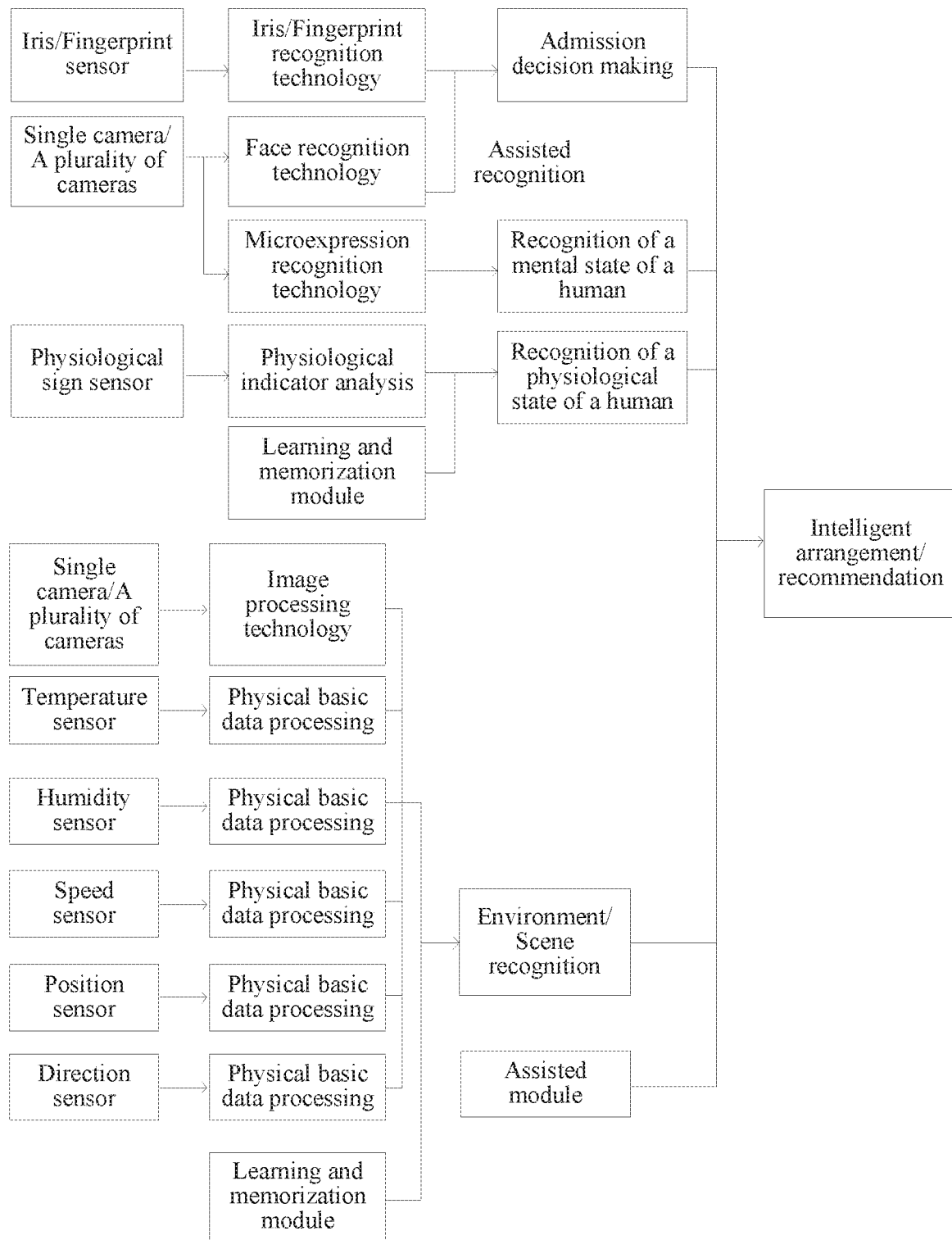
FIG. 11 is a diagram showing an application example according to an embodiment of this application.

As shown in FIG. 11, a mental state of a human is recognized and determined by jointly using image data and brainwave data.

A physiological state of a human is determined by jointly using physiological type feature data such as a magnetic field, various blood indicators, a heart rate, a body temperature and learned and memorized data.

An environmental scene is recognized and determined by jointly using auxiliary learned and memorized data such as image data, temperature data, humidity data, speed data, position data, and direction data.

An intelligent recommendation is jointly determined by using results of the foregoing three types of determination, a trip plan, and an assisted module such as a learning and memorization module, so that a corresponding action instruction is generated and executed to implement interactive control.

Figure 12:
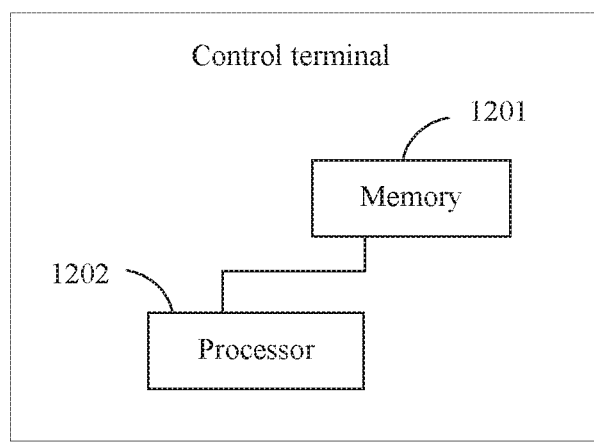
FIG. 12 is a schematic structural diagram of a control terminal according to an embodiment of this application.

FIG. 12 is a schematic structural diagram of a terminal. The terminal may include the following structures: a memory 1201, configured to store an application program and data generated when the application program is run; a processor 1202, configured to execute the application program to implement the following functions: obtaining feature data using at least one sensor connected to an interactive control terminal, generating an action instruction based on the feature data and a decision-making mechanism of the control terminal, and then executing the action instruction.

The terminal may be a terminal device, for example, a mobile phone and VR glasses, that includes a processor having data processing and control functions. For a specific manner of implementing the functions of the structures in the terminal, refer to FIG. 2 to FIG. 11 and corresponding content in the foregoing. The same or corresponding technical features may be applied. Details are not described herein again.

Figure 13:
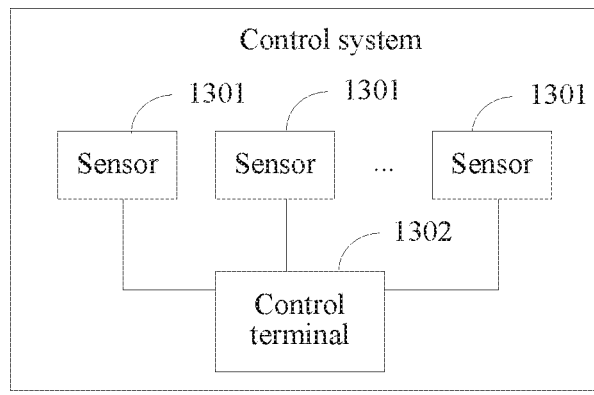
FIG. 13 is a schematic structural diagram of a control system according to an embodiment of this application.

FIG. 13 is a schematic structural diagram of a control system that includes the control terminal shown in FIG. 12. The system may include the following structures: at least one sensor 1301, configured to acquire at least one piece of feature data; and a control terminal 1302, connected to the sensor, and configured to: obtain the feature data via the at least one sensor 1301, generate an action instruction based on the feature data and a decision-making mechanism of the control terminal 1302, and then execute the action instruction. It should be noted that both the sensor and the control terminal here are independent entities, and therefore at least two apparatuses are schematically shown and included in the system.

In an actual product, the sensor may be a part of the control terminal as in the schematic structural diagram of the terminal shown in FIG. 1. That is, the at least one sensor is configured to obtain feature data; and the processor is configured to: generate an action instruction based on the feature data and a decision-making mechanism of the terminal; and execute the action instruction.

For a specific manner of implementing the functions of the control terminal in FIG. 13, refer to FIG. 2 to FIG. 11 and corresponding content in the foregoing. The same or corresponding technical features may be applied. Details are not described herein again.

In addition, an embodiment of the present invention further provides an apparatus, including: an obtaining unit, configured to obtain feature data using at least one sensor, the feature data being data acquired by the terminal using the at least one sensor; a generation unit, configured to generate an action instruction based on the feature data and a decision-making mechanism of the terminal; and an execution unit, configured to execute the action instruction. For a specific manner of implementing the functions of the apparatus, refer to FIG. 2 to FIG. 11 and corresponding content in the foregoing. The same or corresponding technical features may be applied. Details are not described herein.

The embodiments in this specification are all described in a progressive manner, for same or similar parts in the embodiments, reference may be made to these embodiments, and each embodiment focuses on a difference from other embodiments.

All or some of the foregoing embodiments may be implemented by means of software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, a DVD), a semiconductor medium (for example, a solid status disk Solid Status Disk (SSD)), or the like.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A control method, applied to a terminal, comprising:
   obtaining feature data using a sensor, wherein the feature data comprises biological feature data of a user and environmental feature data;
   authenticating the user based on the biological feature data;
   generating a first action instruction based on the biological feature data, the environmental feature data, and a first decision-making mechanism of the terminal by controlling, based on a part of the environmental feature data and a part of the biological feature data, the terminal to display a current movement picture;
   executing the first action instruction in response to the authenticating;
   analyzing the feature data to obtain an output result;
   determining a second decision-making mechanism corresponding to the feature data;
   determining a second action instruction corresponding to the output result based on the second decision-making mechanism;
   performing data learning and data correction on data of the output result to obtain a learned and corrected output result;
   storing the feature data and the learned and corrected output result; and
   generating feedback information based on an execution result generated after executing the second action instruction and storing the feature data.

2. The method of claim 1, wherein generating the first action instruction further comprises:
   obtaining environmental status information based on at least one of temperature data, humidity data, image data, image depth data, direction data, or position data in the feature data, wherein the environmental status information comprises object element information and comfort level information in an environment; and
   controlling, based on the object element information and the comfort level information, the terminal to prompt environment related information.

3. The method of claim 1, wherein generating the first action instruction further comprises:
   obtaining biological movement status information based on at least one of muscle movement status data, brainwave data, or face image data in the feature data, wherein the biological movement status information comprises at least one of biological movement status information and biological emotion status information; and
   controlling, based on the biological movement status information and the biological emotion status information, the terminal to display biological feature related information.

4. The method of claim 1, further comprising at least one step of controlling the terminal to prompt the user with:
   living information;
   work information;
   information indicating that a friend comes online;
   data coupling information;
   game progress information;
   road condition information;
   weather information;
   a reminder to rest; or
   a three-dimensional virtual scene based on the environmental feature data.

5. A terminal, comprising:
   a sensor configured to obtain feature data comprising biological feature data of a user and environmental feature data; and
   a processor coupled to the sensor and configured to:
   authenticate the user based on the biological feature data;
   generate a first action instruction based on the biological feature data, the environmental feature data, and a first decision-making mechanism of the terminal by controlling, based on a part of the environmental feature data and a part of the biological feature data, the terminal to display a current movement picture;
   execute the first action instruction when the user is authenticated;
   analyze the feature data to obtain an output result;
   determine a second decision-making mechanism corresponding to the feature data;
   determine a second action instruction corresponding the output result based on the second decision-making mechanism;
   perform data learning and data correction on data of the output result to obtain a learned and corrected output result;
   store the feature data and the learned and corrected output result; and
   generate feedback information based on an execution result generated after executing the second action instruction and storing the feature data.

6. The terminal of claim 5, wherein the processor is further configured to control, based on a part of the environmental feature data and a part of the biological feature data, the terminal to enter a target working mode.

7. The terminal of claim 5, wherein the processor is further configured to:
   obtain environmental status information based on at least one of temperature data, humidity data, image data, image depth data, direction data, or position data in the feature data, wherein the environmental status information comprises object element information and comfort level information in an environment; and
   control, based on the object element information and the comfort level information, the terminal to prompt environment related information.

8. The terminal of claim 5, wherein the processor is further configured to:

obtain biological movement status information based on at least one of muscle movement status data, brainwave data, or face image data in the feature data, wherein the biological movement status information comprises at least one of biological movement status information or biological emotion status information; and control, based on the biological movement status information or the biological emotion status information, the terminal to display biological feature related information.

9. The terminal of claim 5, wherein the processor is further configured to perform at least one control action to prompt the user with:

living information;
work information;
information indicating that a friend comes online;
data coupling information;
game progress information;
road condition information;
weather information;
a reminder to rest; or
to control the terminal to present a three-dimensional virtual scene generated based on the environmental feature data.

10. The terminal of claim 5, wherein the processor is further configured to:

perform data source recognition and categorization on the feature data to obtain categorized feature data;

process the categorized feature data using a corresponding data processing algorithm to obtain biological recognition output result;

perform first element recognition on the biological feature data using a biological recognition algorithm to obtain the biological recognition output result, wherein the biological recognition output result comprises at least one of a fingerprint recognition result, an iris recognition result, a face recognition result, or a biological movement status recognition result; and perform second element recognition on the environmental feature data using a physical basic data processing algorithm to obtain the biological recognition output result, wherein the biological recognition output result further comprises at least one of a type recognition result, a size recognition result, a position and direction recognition result, a material recognition result, a status recognition result of an object in an environment, an environmental temperature recognition result, or an environmental humidity recognition result.

11. A computer program product comprising computer-executable instructions for storage on a non-transitory computer-readable medium that, when executed by a processor, cause a terminal to:

obtain feature data using a sensor, wherein the feature data comprises biological feature data of a user and environmental feature data;

authenticate the user based on the biological feature data;

generate an action instruction based on the biological feature data, the environmental feature data and a decision-making mechanism of the terminal by controlling, based on a part of the environmental feature data and a part of the biological feature data, the terminal to display a current movement picture;

execute the action instruction when the user is authenticated;

perform data source recognition and categorization on the feature data to obtain categorized feature data;

process the categorized feature data using a corresponding data processing algorithm to obtain an output result;

perform first element recognition on the biological feature data using a biological recognition algorithm to obtain the output result, wherein the output result comprises at least one of a fingerprint recognition result, an iris recognition result, a face recognition result, or a biological movement status recognition result; and perform second element recognition on the environmental feature data using a physical basic data processing algorithm to obtain the output result, wherein the output result further comprises at least one of a type recognition result, a size recognition result, a position and direction recognition result, a material recognition result, a status recognition result of an object in an environment, an enviormental temperature recognition result, or an enviormental humidity recognition result.

12. The computer program product of claim 11, wherein the terminal is further caused to adjust the current movement picture in real time based on the feature data.

13. The method of claim 1, wherein the current movement picture is adjusted in real time based on the feature data.

14. The terminal of claim 5, wherein the processor is further configured to adjust the current movement picture in real time based on the feature data.

15. The computer program product of claim 11, wherein the processor is further configured to control, based on a part of the environmental feature data and a part of the biological feature data, the terminal to enter a target working mode.

16. The computer program product of claim 11, wherein the processor is further configured to:

obtain environmental status information based on at least one of temperature data, humidity data, image data, image depth data, direction data, or position data in the feature data, wherein the environmental status information comprises object element information and comfort level information in an environment; and control, based on the object element information and the comfort level information, the terminal to prompt environment related information.

17. The computer program product of claim 11, wherein the processor is further configured to:

obtain biological movement status information based on at least one of muscle movement status data, brainwave data, or face image data in the feature data, wherein the biological movement status information comprises at least one of biological movement status information or biological emotion status information; and control, based on the biological movement status information or the biological emotion status information, the terminal to display biological feature related information.

18. The computer program product of claim 11, wherein the processor is further configured to perform at least one control action to prompt the user with:

living information;
work information;
information indicating that a friend comes online;
data coupling information;
game progress information;
road condition information;
weather information;
a reminder to rest; or
to control the terminal to present a three-dimensional virtual scene generated based on the environmental feature data.

* * * * *

UNITED STATES PATENT AND TRADEMARK OFFICE
CERTIFICATE OF CORRECTION

PATENT NO. : 11,562,271 B2
APPLICATION NO. : 16/496265
DATED : January 24, 2023
INVENTOR(S) : Jianfeng Wang et al.

It is certified that error appears in the above-identified patent and that said Letters Patent is hereby corrected as shown below:

In the Claims

Claim 5, Column 26, Line 41: "the output" should read "to the output"

Signed and Sealed this
Twenty-first Day of March, 2023

Katherine Kelly Vidal
Director of the United States Patent and Trademark Office